United States Patent
Watkins et al.

(10) Patent No.: US 12,522,544 B2
(45) Date of Patent: *Jan. 13, 2026

(54) NANOPOROUS STRUCTURES AND ASSEMBLIES INCORPORATING THE SAME

(71) Applicant: University of Massachusetts, Boston, MA (US)

(72) Inventors: James J. Watkins, South Hadley, MA (US); Dong-Po Song, Rizhao (CN); Wenhao Li, Sunderland, MA (US)

(73) Assignee: University of Massachusetts, Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,621

(22) Filed: Mar. 14, 2024

(65) Prior Publication Data

US 2024/0217886 A1 Jul. 4, 2024

Related U.S. Application Data

(63) Continuation of application No. 16/326,069, filed as application No. PCT/US2017/047648 on Aug. 18, 2017, now Pat. No. 11,964,920.

(Continued)

(51) Int. Cl.
*C04B 35/524* (2006.01)
*B05D 3/06* (2006.01)
(Continued)

(52) U.S. Cl.
CPC ............ *C04B 38/0022* (2013.01); *B05D 3/06* (2013.01); *B29C 70/00* (2013.01); *C04B 35/524* (2013.01);
(Continued)

(58) Field of Classification Search
CPC .. H01M 4/0471; C04B 35/524; C04B 35/528; C04B 35/83; C04B 38/0022
See application file for complete search history.

(56) References Cited

U.S. PATENT DOCUMENTS 7,629,272 B2 * 12/2009 Waldfried ......... H01L 21/76825
438/783
11,964,920 B2 * 4/2024 Watkins .................. B05D 3/06
(Continued)

FOREIGN PATENT DOCUMENTS

| CN | 101538033 A | 9/2009 |
| CN | 105670027 A | 6/2016 |

(Continued)

OTHER PUBLICATIONS

"U.S. Appl. No. 16/326,069, Advisory Action mailed Mar. 10, 2023", 3 pgs.

(Continued)

*Primary Examiner* — Jun Li
(74) *Attorney, Agent, or Firm* — Schwegman Lundberg & Woessner, P.A.

(57) ABSTRACT

Various embodiments disclosed relate to a method of forming a composite including a carbon composite structure. The method includes disposing a precursor composition on a substrate. The composition includes a porogen component, a carbon component, and a catalyst component. The method further includes irradiating the precursor composition to form the carbon composite structure.

20 Claims, 5 Drawing Sheets

Related U.S. Application Data

(60) Provisional application No. 62/452,087, filed on Jan. 30, 2017, provisional application No. 62/377,003, filed on Aug. 19, 2016.

(51) Int. Cl.

| | |
|---|---|
| *B29C 70/00* | (2006.01) |
| *C04B 35/528* | (2006.01) |
| *C04B 35/532* | (2006.01) |
| *C04B 35/83* | (2006.01) |
| *C04B 38/00* | (2006.01) |
| *C04B 38/02* | (2006.01) |
| *H01M 4/04* | (2006.01) |
| *H01M 4/133* | (2010.01) |
| *H01M 4/1393* | (2010.01) |
| *H01M 4/587* | (2010.01) |
| *H01M 6/40* | (2006.01) |
| *C04B 111/00* | (2006.01) |

(52) U.S. Cl.
CPC .......... *C04B 35/528* (2013.01); *C04B 35/532* (2013.01); *C04B 35/83* (2013.01); *C04B 38/02* (2013.01); *H01M 4/043* (2013.01); *H01M 4/0471* (2013.01); *H01M 4/049* (2013.01); *H01M 4/133* (2013.01); *H01M 4/1393* (2013.01); *H01M 4/587* (2013.01); *H01M 6/40* (2013.01); *C04B 2111/0081* (2013.01); *C04B 2111/00853* (2013.01); *C04B 2235/5264* (2013.01); *C04B 2235/5454* (2013.01)

(56) References Cited

U.S. PATENT DOCUMENTS

| | | | |
|---|---|---|---|
| 2003/0039883 | A1 | 2/2003 | Notten et al. |
| 2005/0238889 | A1 | 10/2005 | Iwamoto et al. |
| 2006/0024976 | A1 | 2/2006 | Waldfried et al. |
| 2007/0134151 | A1 | 6/2007 | Jo et al. |
| 2011/0129732 | A1 | 6/2011 | Bachrach et al. |
| 2011/0183206 | A1 | 7/2011 | Davis et al. |
| 2013/0069011 | A1 | 3/2013 | Thomas et al. |
| 2013/0251943 | A1 | 9/2013 | Pei et al. |
| 2014/0342223 | A1 | 11/2014 | Voelker et al. |
| 2015/0060342 | A1 | 3/2015 | Dileo et al. |
| 2015/0367478 | A1 | 12/2015 | Lefevre et al. |
| 2016/0160379 | A1* | 6/2016 | Choi .................... C01B 32/188 117/9 |
| 2016/0311690 | A1* | 10/2016 | Dai ........................ C01B 32/00 |
| 2017/0018801 | A1 | 1/2017 | Grubbs et al. |
| 2018/0035481 | A1 | 2/2018 | Panther |
| 2020/0377420 | A1 | 12/2020 | Watkins et al. |
| 2023/0090189 | A1 | 3/2023 | Yu et al. |

FOREIGN PATENT DOCUMENTS

| | | | | | |
|---|---|---|---|---|---|
| CN | 106099108 | A | * | 11/2016 | ............ H01M 4/583 |
| CN | 110167877 | A | | 8/2019 | |
| JP | 2008179787 | A | | 8/2008 | |
| JP | 5165360 | B2 | * | 3/2013 | |
| JP | 2019534833 | A | | 12/2019 | |
| JP | 2023123465 | A | | 9/2023 | |
| KR | 100702156 | B1 | * | 4/2007 | |
| KR | 20140092452 | A | * | 7/2014 | |
| KR | 20140141838 | A | | 12/2014 | |
| WO | WO-2015183369 | A2 | * | 12/2015 | ............ F16D 69/023 |
| WO | WO-2016204240 | A1 | * | 12/2016 | ............ C01B 32/05 |
| WO | WO-2018035481 | A1 | | 2/2018 | |

OTHER PUBLICATIONS

"U.S. Appl. No. 16/326,069, Corrected Notice of Allowability mailed Dec. 21, 2023", 5 pgs.
"U.S. Appl. No. 16/326,069, Examiner Interview Summary mailed Oct. 13, 2023", 2 pgs.
"U.S. Appl. No. 16/326,069, Final Office Action mailed Dec. 1, 2022", 19 pgs.
"U.S. Appl. No. 16/326,069, Non Final Office Action mailed Jul. 3, 2023", 21 pgs.
"U.S. Appl. No. 16/326,069, Non Final Office Action mailed Jul. 14, 2022", 13 pgs.
"U.S. Appl. No. 16/326,069, Notice of Allowance mailed Dec. 14, 2023", 10 pgs.
"U.S. Appl. No. 16/326,069, Preliminary Amendment filed Feb. 15, 2019", 8 pgs.
"U.S. Appl. No. 16/326,069, Response filed Mar. 1, 2023 to Final Office Action mailed Dec. 1, 2022", 12 pgs.
"U.S. Appl. No. 16/326,069, Response filed Apr. 3, 2023 to Advisory Action mailed Mar. 10, 2023", 13 pgs.
"U.S. Appl. No. 16/326,069, Response filed Jun. 1, 2022 to Restriction Requirement mailed Apr. 1, 2022", 7 pgs.
"U.S. Appl. No. 16/326,069, Response filed Nov. 3, 2023 to Non Final Office Action mailed Jul. 3, 2023", 15 pgs.
"U.S. Appl. No. 16/326,069, Response filed Nov. 14, 2022 to Non Final Office Action mailed Jul. 14, 2022", 11 pgs.
"U.S. Appl. No. 16/326,069, Restriction Requirement mailed Apr. 1, 2022", 7 pgs.
"European Application Serial No. 17842228.3, Communication Pursuant to Article 94(3) EPC mailed Feb. 24, 2021", 7 pgs.
"European Application Serial No. 17842228.3, Communication Pursuant to Article 94(3) EPC mailed Jul. 5, 2022", 6 pgs.
"European Application Serial No. 17842228.3, Extended European Search Report mailed Mar. 12, 2020", 7 pgs.
"European Application Serial No. 17842228.3, Response filed Aug. 31, 2021 to Communication Pursuant to Article 94(3) EPC mailed Feb. 24, 2021", 10 pages.
"European Application Serial No. 17842228.3, Response filed Sep. 17, 2020 to Extended European Search Report mailed Mar. 12, 2020", 8 pgs.
"European Application Serial No. 17842228.3, Response filed Oct. 7, 2019 to Communication pursuant to Rules 161(2) and 162 EPC", 9 pgs.
"European Application Serial No. 17842228.3, Response Filed Nov. 8, 22 to Communication Pursuant to Article 94(3) EPC mailed Jul. 5, 2022", 18 pgs.
"International Application Serial No. PCT/US2017/047648, International Search Report mailed Nov. 6, 2017", 3 pgs.
"International Application Serial No. PCT/US2017/047648, Written Opinion mailed Nov. 6, 2017", 9 pgs.
"Japanese Application Serial No. 2019-510367, Examiners Decision of Final Refusal mailed Feb. 1, 2023", w/ English translation, 6 pgs.
"Japanese Application Serial No. 2019-510367, Final Notification of Reasons for Refusal mailed May 10, 2022", w/ English Translation, 6 pgs.
"Japanese Application Serial No. 2019-510367, Notification of Reasons for Refusal mailed Sep. 7, 2021", with machine English translation, 10 pages.
"Japanese Application Serial No. 2019-510367, Response Filed Nov. 10, 22 to Final Notification of Reasons for Refusal mailed May 10, 2022", W/ English Claims, 14 pgs.
"Japanese Application Serial No. 2019-510367, Response filed Dec. 7, 2021 to Notification of Reasons for Refusal mailed Sep. 7, 2021", with English claims, 28 pages.
Brust, et al., "Synthesis and Reactions of Functionalised Gold Nanoparticles", J. Chem. Soc., Chem. Communication, (1995), 1655-1656.
Chuenchom, et al., "Recent progress in soft-templating of porous carbon materials", Cite this: Soft Matter, 8, (2012), 13 pgs.
Kim, "Machine translation of (KR20140141838A)", (Dec. 11, 2014).
Shi, et al., "Machine translation of (CN105670027A)", (Jun. 15, 2016).
Song, et al., "Thermally Tunable Metallodielectric Photonic Crystals from the Self-Assembly of Brush Block Copolymers and Gold Nanoparticles", Adv. Optical Mater, (2015), 1169-1175.

(56) References Cited

OTHER PUBLICATIONS

"European Application Serial No. 17842228.3, Communication Pursuant to Article 94(3) EPC mailed Jan. 17, 2025", 4 pgs.

"European Application Serial No. 17842228.3, Response filed Jul. 17, 2025 to Communication Pursuant to Article 94(3) EPC mailed Jan. 17, 2025", W/ English Claims, 10 pgs.

"International Application Serial No. PCT/US2017/047648, International Preliminary Report on Patentability malled Feb. 28, 2019", 11 pgs.

"Japanese Application Serial No. 2023-090189, Final Notification of Reasons for Refusal mailed Jun. 3, 2025", w/o English Translation, 4 pgs.

"Japanese Application Serial No. 2023-090189, Notification of Reasons for Refusal mailed Aug. 6, 2024", w/ English translation, 9 pgs.

"Japanese Application Serial No. 2023-090189, Response filed Feb. 5, 2025 to Notification of Reasons for Refusal mailed Aug. 6, 2024", w/ English Claims, 11 pgs.

* cited by examiner

NANOPOROUS STRUCTURES AND ASSEMBLIES INCORPORATING THE SAME

CROSS-REFERENCE TO RELATED APPLICATIONS

This application is a continuation of U.S. patent application Ser. No. 16/326,069, filed Feb. 15, 2019, which is a U.S. National Stage Filing under 35 U.S.C. 371 from International Application No. PCT/US2017/047648 entitled "NANOPOROUS STRUCTURES AND ASSEMBLIES INCORPORATING THE SAME," filed on Aug. 18, 2017, and published as WO 2018/035481, which claims the benefit of priority to U.S. Provisional Patent Application Ser. No. 62/377,003 entitled "RAPID AND LARGE AREA FORMATION OF POROUS MEDIA AND DEVICE LAYERS," filed Aug. 19, 2016, the disclosures of which are incorporated herein in their entirety by reference.

This application further claims the benefit of priority to U.S. Provisional Patent Application Ser. No. 62/452,087 entitled "GRAPHITIC MULTI-LAYER STRUCTURES AND METHODS OF MAKING THE SAME," filed Jan. 30, 2017, the disclosure of which is incorporated herein in its entirety by reference.

STATEMENT OF GOVERNMENT SUPPORT

This invention was made with Government support under CMMI-1025020 awarded by the National Science Foundation. The U.S. Government has certain rights in this invention.

BACKGROUND

Binder-free mesoporous hybrid carbon coatings on polymer or metal substrates can be used as a high-surface-area electrodes to achieve superior device performances. However, achieving the direct fabrication of such coatings is difficult due to substrate degradation during the high temperature carbonization process.

SUMMARY OF THE DISCLOSURE

The present disclosure provides a method of forming composite including a carbon composite structure. The method includes disposing a precursor composition on a substrate. The composition includes a porogen component, a carbon component, and a catalyst component. The method further includes irradiating the precursor composition to form the carbon composite structure.

The present disclosure further provides an electrode. The electrode includes an individual layer of a carbon composite structure having an elongated profile. The electrode is formed by disposing a precursor composition on a substrate. The composition includes a porogen component, a carbon component, and a catalyst component. The precursor composition is irradiated to form the carbon composite structure.

The present disclosure further provides an article. The article includes a substrate with a carbon composite structure having an elongated profile disposed thereon to form an electrode. The electrode is formed by disposing a precursor composition on a substrate. The composition includes a porogen component, a carbon component, and a catalyst component. The precursor composition is irradiated to form the carbon composite structure.

The present disclosure presents various advantages, some of which are unexpected. According to various embodiments, the structures are well suited to be supports for various functional materials including noble metals or metal oxide nanoparticles (NPs) which can greatly improve device performances such as the capacity of a lithium ion battery. For example, the structures are highly conductive and can exhibit excellent performance as $Li^+$ battery anodes (e.g., ~1000 mAh/g).

The present disclosure provides a method including disposing upon a substrate a precursor composition comprising a polymer, where the polymer serves as a porogen; a light absorbing component, a support phase precursor and a solvent; irradiating the precursor composition with electromagnetic radiation of a wavelength and an intensity that is effective to degrade the polymer and to activate the support phase precursor; and forming a hierarchical structure on the substrate.

The present disclosure provides an article comprising a substrate having a porous structure disposed thereon; in which an area that is greater than 1 square meter of the substrate has the porous structure disposed on all of it.

The present disclosure further provides a battery. The battery includes a substrate. The substrate includes an anode layer. The anode layer includes a carbon composite structure disposed on the substrate to form an electrode The present disclosure further provides a method of forming a battery. The method includes disposing a precursor composition on a substrate. The precursor composition includes a porogen component, a carbon component, and a catalyst component. The method further includes contacting the precursor composition with a mold. The mold includes a plurality of protrusions in contact with the precursor composition. The method further includes at least one of raising the temperature of the precursor composition and irradiating the precursor composition to form an anode layer. The method further includes disposing a separator layer on the anode layer. The method further includes disposing a conductor layer on the anode layer to form the battery.

According to various embodiments, relatively low-cost iron/iron oxide nanoparticles can be used to catalyze the formation of the structures or provide heat by acting as a nanoheater through absorption of light. According to various embodiments the structures can form anodes for lithium ion batteries. According to various embodiments the structures can form high performance anodes due to several attractive features including high surface areas of the mesoporous structures, high energy density contributed by iron oxide nanoparticles, high conductivity from graphitic nanowires as well as good integrity (binder free) of the films, and good mechanical properties provided by an amorphous carbon matrix.

According to various embodiments, the process of forming the structure involves simple coating of the precursor composition followed by rapid conversion of the carbon component to the desired carbon phase and/or removal of the porogen using sub-millisecond light pulses, it is easily scaled to high volume roll-to-roll processing and can be performed at low temperatures (e.g., less than 400° C.). The use of polymers with defined architectures such as block copolymers as the porogen/templating component can result the formation of materials with very well controlled pore sizes and pore size distribution.

According to various embodiments the method can allow for a direct conversion from the precursor composition to the desired carbon composite structure to form the anode structure. Intermediate steps including formulating solutions from graphitic intermediates and preparing nanoparticles coated with graphitic carbon can avoided. These intermediate steps can require the addition of a polymer or other binders that can degrade performance. However, the direct conversion form the precursor composition to the carbon-composite multi-layer structure can result in avoiding the intermediate step and therefore the need for a polymer or binder.

According to various embodiments, a battery including an at least an anode having the pattern structure described herein can have an increased surface area compared to a corresponding battery having a non-patterned anode. According to some examples, this can increase the power output of the battery.

BRIEF DESCRIPTION OF THE FIGURES

The drawings illustrate generally, by way of example, but not by way of limitation, various embodiments discussed in the present document.

DETAILED DESCRIPTION

Figure 1:
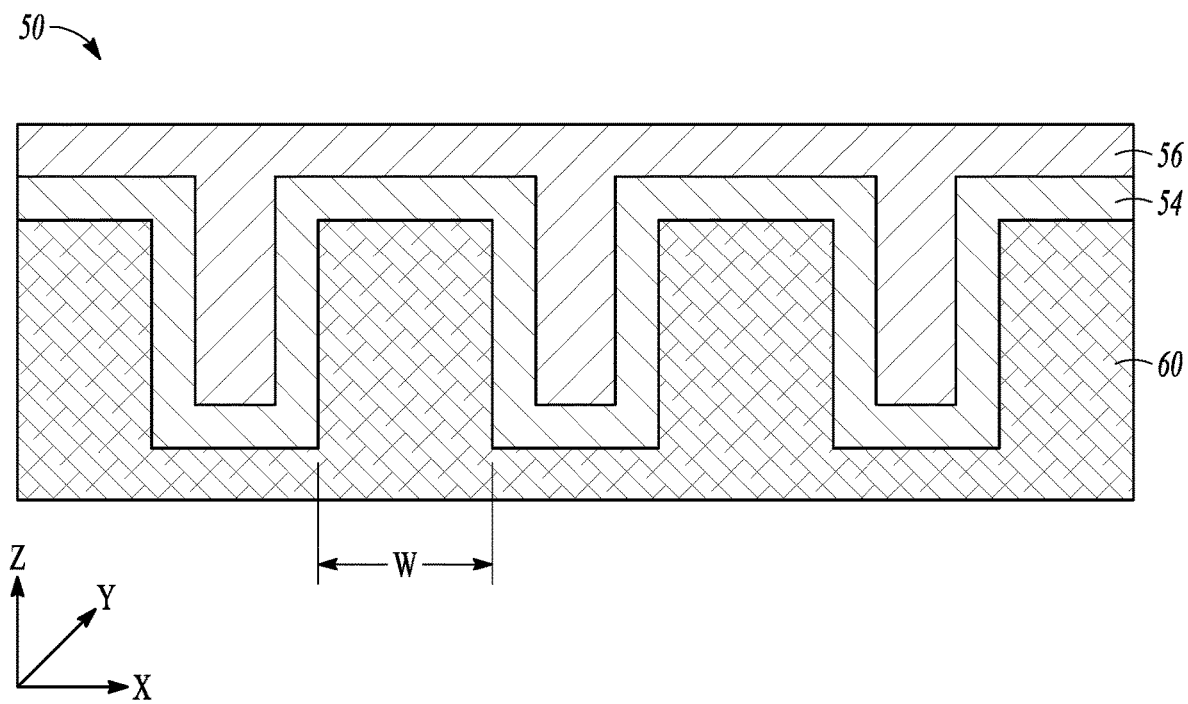
FIG. 1 is a sectional view of a battery that includes a carbon composite structure, in accordance with various embodiments.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{40}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

Disclosed herein is a method of rapidly manufacturing large areas of nanoporous hybrid films that comprise a porous material disposed on a substrate. In an example, the nanoporous hybrid films can have hierarchical structures disposed on a substrate that can be a rigid or flexible. Commercially available rigid or flexible substrates can be used if desired. A hierarchical structure is composed of at least two different types of structural features. For example, a hierarchical porous structure may have different pore sizes or pore shapes.

Disclosed further herein is a method of forming a composite including graphitic multi-layer structure. The graphitic multi-layer structure can be porous and disposed on a substrate that can include the hybrid film.

Commercially available rigid or flexible substrates can be used if desired and can be made of a conductive material In some examples, disposing the precursor composition on the substrate, includes applying the precursor composition by spraying or brushing the precursor composition on the substrate. In other examples, the substrate can be rolled through the substrate. The application of the precursor composition to the substrate can be such that the substrate is entirely coated with the precursor composition or partially coated with the precursor composition. For example, about 5% to about 100% of the surface area of the substrate can be coated with the precursor composition, or about 75% to about 100%, about 85% to about 100%, or less than about, equal to about, or greater than about 5%, 10, 15, 20, 25, 30, 35, 40, 45, 50, 55, 60, 65, 70, 75, 80, 85, 90, 95, or about 100% of the surface area of the substrate can be coated with the precursor composition.

The substrate can be a rigid substrate or can be a flexible substrate. The substrate can include many different materials including metals such as aluminum, nickel, copper, and alloys thereof. The substrate can also include a polymer as described herein. The substrate can also include a metalized polymer film. Examples of metalized polymer films include polymers such as polypropylene, polyethylene terephthalate, nylon, or polyethylene that have a quantity of aluminum, nickel, or chromium deposited thereto. The substrate can be in the form of a sheet, rod, or foil and may have a surface area greater than 10 square meters, greater than 20 square meters, or greater than 50 square meters.

In some examples, the substrate (after irradiation of the precursor composition) is rollable (e.g., flexible having an elastic modulus of less than $10^6$ GPa) so that it can, for example, be used in roll-to-roll processing. Therefore, it is possible to roll the substrate to form a roll having a diameter ranging from about 0.10 meters to about 10 meters, about 0.20 meters to about 9 meters, about 1 meter to about 5 meters, or less than about, equal to about, or greater than about, 0.10 meters about 0.20, 0.5, 1, 1.5, 2, 2.5, 3, 3.5, 4, 4.5, 5, 5.5, 6, 6.5, 7, 7.5, 8, 8.5, 9, 9.5, or about 10 meters.

In an example, the substrate can be a flexible substrate and can include a first polymer. As described herein, the porogen also comprises a polymer (hereinafter the second polymer). The first polymer used in the substrate is preferably different from the second polymer used in the precursor composition. In an embodiment, the first polymer used in the substrate has a higher glass transition temperature, a higher melt temperature and a higher degradation temperature than at least one of the glass transition temperature, the melt temperature and the degradation temperature of the second polymer. In an embodiment, it can be desirable for the first polymer used in the substrate to have a higher degradation temperature than the degradation temperature of the second polymer. Both the first polymer and the second polymer can be selected from the list of polymers herein.

The first polymer of the substrate can be in a range of about 50 wt % to about 100 wt % of the substrate, about 90 wt % to about 100 wt %, or less than, equal to, or greater than about 50 wt %, 55, 60, 65, 70, 75, 80, 85, 90, 95, or 100 wt % of the substrate.

The precursor composition can include a porogen component. The porogen component can range from about 5 wt % to about 50 wt % of the precursor composition, about 20 wt % to about 40 wt %, or less than about, equal to about, or greater than about 5 wt %, 10, 15, 20, 25, 30, 35, 40, 45, or 50 wt % of the precursor composition.

Porogens can be a mass of particles, of a specified shape and size, used to make pores in molded structures that can be used for a variety of different applications. In various examples, the porogens can be block copolymers or homopolymers. During formation of the film, the porogen is the phase that is removed to make the pores in the final structure. In some examples, the porogen is removed by thermal decomposition. In other examples, it can be dissolved away after the structure has set. The pores in the final structure can be formed to be any suitable range. For example the pores can be in a range of from about 0.5 nm to about 1000 nm, about 2 nm to about 50 nm, or less than, equal to, or greater than about 0.5 nm, 20, 60, 80, 100, 120, 140, 160, 180, 200, 220, 240, 260, 280, 300, 320, 340, 360, 380, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or about 1000 nm.

The porogen component includes a second polymer that is different than the first polymer, if present, of the substrate. The second polymer ranges from about 1 wt % to about 100 wt % of the porogen component, or from about 90 wt % to about 100 wt %, or less than about, equal to about, or greater than about 1 wt %, 5, 10, 15, 20, 25, 30, 35, 40, 45, 50, 55, 60, 65, 70, 75, 80, 85, 90, 95, or 100 wt % of the porogen component.

The first polymer of the substrate and the second polymer of the porogen component can be selected from many suitable polymers. Examples of the first and the second polymers are thermoplastic polymers, thermosetting polymers, blends of thermoplastic polymers, blends of thermosetting polymers, and blends of thermoplastic polymers with thermosetting polymers. The polymer can be a homopolymer, a copolymer, a block copolymer, an alternating copolymer, an alternating block copolymer, a random copolymer, a random block copolymer, a graft copolymer, a star block copolymer, an ionomer, a dendrimer, a liquid crystalline polymer, or a combination comprising at least one of the foregoing polymers. The first or second polymer may be semi-crystalline or amorphous.

Examples of thermoplastic polymers are polyacetals, polyacrylics, polycarbonates, polystyrenes, polyesters, polyamides, polyamideimides, polyarylates, polyacrylates, polymethylmethacrylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, polyolefins, polyacrylamides, or the like, or a mixture comprising at least one of the foregoing organic polymers.

Examples of thermosetting polymers suitable for blending with the reduced crystallinity cellulose include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, unsaturated polyesterimides, or the like, or a mixture comprising at least one of the foregoing thermosetting polymers.

An example of a first polymer that can be used in the substrate is a polyester substrate e.g., a polyethylene terephthalate substrate. An example of a suitable second polymer is a block copolymer.

The second polymer can serve as a binder for the precursor composition after it is disposed on the first polymer (which, if present, forms the substrate). As will be detailed herein, the precursor composition is dried after being disposed on the substrate and the second polymer serves to bind the precursor composition to form a precursor layer on the substrate.

In an embodiment, the second polymer (that is used in the precursor composition) can be a block copolymer. Suitable block copolymers are those that have a lamellar, cylindrical, bicontinuous or spherical morphology upon undergoing phase separation. The block copolymer can be a diblock or a triblock. A diblock can have a first block and a second block whereas a triblock as a first, second and a third block. In some embodiments, the first and third block of the triblock can be chemically identical to each other. The respective blocks can be selected from the list of polymers provided above so long as the first and second blocks of the diblock copolymers are different from each other. In an example, in the case of triblock copolymers, the first and second blocks are different from each other, while in some cases, the first, second and third blocks can be different from each other.

Examples of block copolymers (second polymers) that may be used in the precursor composition include poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl (meth)acrylate), poly(methyl methacrylate-b-t-butyl methacrylate), poly(ethylene oxide-b-propylene oxide), poly(styrene-b-tetrahydrofuran), poly(styrene-b-isoprene-b-ethylene oxide), poly(styrene-b-dimethylsiloxane), poly(styrene-b-trimethylsilylmethyl methacrylate), poly(methyl methacrylate-b-dimethylsiloxane), poly(methyl methacrylate-b-trimethylsilylmethyl methacrylate), or the like, or a combination thereof.

In another embodiment, the block copolymer can be a block copolymer, where each block has a backbone polymer that has grafted onto the backbone of a different graft polymer. An exemplary backbone polymer is a polynorbornene, while the first graft and second graft selected from the lists detailed above. In an embodiment, the first graft is polystyrene while the second graft is polyethylene oxide. An example block copolymer is therefore (polynorbornene-graft-poly(styrene))-block-(polynorbornene-graft-poly(ethylene oxide)). Such polymers can be produced by ring opening metathesis polymerization.

In some examples, it is desirable for the block copolymer to be a brush copolymer or a bottle brush block copolymer. A polymer brush comprises a polymer that is tethered to a surface of the substrate. Brush or bottlebrush block copolymers, also refer to "molecular brushes", and are a new class of large macromolecules that have at least two different types of polymer side chains densely grafted onto a linear polymer backbone. Due to the strong steric repulsion of the polymer side chains, the backbone of a bottlebrush block copolymer is highly stretched resulting in a worm-like molecular conformation. Compared with their linear analogues, bottlebrushes can be superior for nanotechnology as polymer chain entanglements can be greatly reduced between the worm-like macromolecules, which can allow rapid self-assembly to create well-ordered nanostructures.

The brush or bottle brush can be either in a solvated state, where the tethered polymer layer includes a polymer and solvent, or in a melt state, where the tethered chains completely fill up the space available. These polymer layers can be tethered to flat substrates such as silicon wafers, or highly curved substrates such as nanoparticles. The brushes are often characterized by the high density of grafted chains. The limited space then leads to a strong extension of the chains, and unusual properties of the system.

In some examples, at least one of the blocks of the block copolymer may have a functional group that can interact with the precursor to the support phase. The functional group may be pendant to the chain backbone (i.e., it is a part of the repeat unit), be an end group, or be both pendant to the chain backbone as well as be an end group. An example of such a functional group is a metal alkoxide such as a trialkoxysilane. In an example, a reactive functional end group may be used to tether the copolymer to a substrate to form a bottlebrush copolymer.

If present, a solvent is one that is effective to solubilize the second polymer present in the precursor composition. Depending upon the polymer used and the chemistry of the other ingredients, the solvent can be an aprotic polar solvent, apolar protic solvent, a non-polar solvent, or a combination thereof.

Examples of aprotic polar solvents are water, propylene carbonate, ethylene carbonate, butyrolactone, acetonitrile, benzonitrile, nitromethane, nitrobenzene, sulfolane, dimethylformamide, N-methylpyrrolidone, or the like, or a combination thereof. Polar protic solvents include methanol, acetonitrile, nitromethane, ethanol, propanol, isopropanol, butanol, or the like, or a combination thereof. Examples of non-polar solvents include benzene, toluene, methylene chloride, carbon tetrachloride, hexane, diethyl ether, tetrahydrofuran, or the like, or a combination thereof. Co-solvents comprising at least one polar solvent and at least one non-polar solvent may also be utilized to modify the swelling power of the solvent and thereby adjust the solubility of the solvent for the polymer. The solvent can be used in an amount of 50 to 90 wt %, based on a total weight of the precursor composition.

A precursor to the support phase (hereinafter support phase precursor) generally comprises a reactive species that upon reaction produces a skeletal structure to support the hierarchical structures that are disposed on the substrate. The support phase precursor can include a metal alkoxide, a polyoctahedral silsesquioxane (hereinafter silsesquioxanes), or any other reactive species that is capable of providing a structure to the ingredients of the precursor composition upon being heated.

Examples of metal alkoxides are silicon alkoxides (e.g., silicon trimethoxysilane, tetraethylorthosilicate, or the like) titanium alkoxides (e.g., titanium isopropoxide, or the like), zirconium alkoxides (e.g., zirconium isopropoxide), aluminum alkoxides (e.g., aluminum sec-butoxide), or the like, or a combination thereof. When metal alkoxides are included in the precursor composition, they may react with the functional group and with itself to form a skeletal network or a precursor to the skeletal network within the precursor composition. Upon heating the precursor composition, the polymer is degraded and the degradation of the polymer leaves behind a porous network of metal oxide particles.

Silsesquioxanes have the structure $(RSiO_{1.5})_n$ wherein R represents one or more types of substituents, typically organic in nature. An alternate designation is "T-resin," indicating that there are three (tri-substituted) oxygen atoms substituting the silicon. These molecules have rigid, thermally stable silicon-oxygen frameworks whose structures and characteristics are intermediate between those of silica glass $(SiO_2)_n$ and silicone polymer $(R_2SiO)_n$. The silsesquioxane moieties in the precursor composition may be selected from among various structural types: polyhedral cage, ladder, random, or a mixture thereof, as shown in formulas 1-3 below.

Formula (1) shows a random silsesquioxane moiety

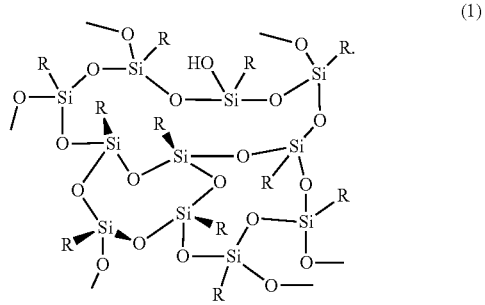

Formula (2) depicts ladder silsesquioxanes:

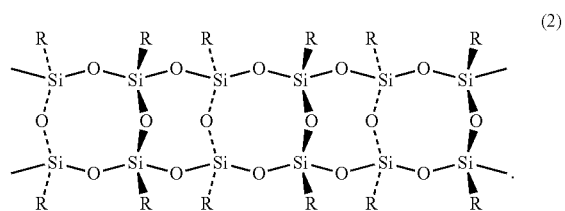

Formula (3) depicts complete and incomplete (partial) polyhedral cage silsesquioxanes:

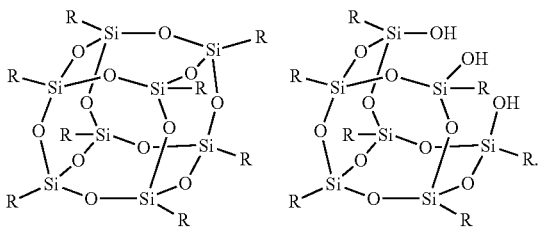

As mentioned above, silsesquioxanes can have a cage-like structure. The structure of a cage-type silsesquioxane is often in the form of a cube, hexagonal prism, octagonal prism, decagonal prism, a dodecagonal prism, or even opened cage-like structure. Various cage-type silsesquioxanes are sold by Hybrid Plastics under the POSS tradename where they are described as being polyhedral oligomeric silsesquioxanes and have the generic formula $(RSiO_{1.5})_n$ wherein R is chosen from an organic or an inorganic moiety and n is 6, 8, 10, 12, or higher. As with all silsesquioxanes, these molecules have rigid, thermally stable silicon-oxygen frameworks with an oxygen to silicon ratio of 1.5, and most contain covalently-bound organic (and sometimes inorganic) groups that provide an outer layer comprising, for example, hydrocarbons (e.g., vinyl, isooctyl, cyclohexyl, cyclopentyl, isobutyl, or other hydrocarbons), as well as functional groups such as ester, vinyl, epoxy, acrylate, hydroxyl, or other functional groups. A $Si_8$ (where n=8) POSS structure is illustrated below in Formula (4):

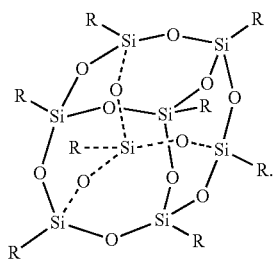

(4)

Through variation of the R group on the silicon atom, a variety of functional groups can be placed off the corner of the POSS framework. Each R group can be a reactive group that can participate in polymerization to cure the support phase precursor of the precursor composition, or alternatively, it can be a non-reactive group that can facilitate chemical compatibilization with other species present in the composition. In addition to their role in enabling polymerization or compatibilization, the various types of R groups can be selected or tailored to impart other desired attributes, such as flexibility or stiffness, thermal stability, chemical resistance, cure speed, refractive index, and so on. In an exemplary embodiment, the R group on the silicon atom is a reactive functional group that can participate in UV-initiated polymerization and includes an acrylate, a methacrylate, a vinyl, a vinyl ether, a thiol or an epoxide, a hydroxyl, or a combination thereof.

Another way of detailing the aforementioned structure of the POSS cage-type silsesquioxane moiety includes the general formula $R_{n-m}T_nY_m$ where R is a reactive functional species that can enable UV-induced polymerization of the coating; n is 6, 8, 10, 12 or higher; m is 1 to n; T is $SiO_{1.5}$; and Y represents the non-reactive species that may facilitate chemical compatibilization with other species present in the composition. In an exemplary embodiment, the various R groups on the silane can be the same or different and are reactive functional groups that can enable polymerization and/or crosslinking and includes an acrylate, a methacrylate, a vinyl, a vinyl ether, a thiol or an epoxide. The Y groups include non-reactive groups such as a $C_1$-$C_{24}$ straight, branched, or cyclic alkyls, aliphatic or cycloaliphatic ethers or polyethers, aliphatic or cycloaliphatic esters or polyesters, aliphatic or cycloaliphatic siloxanes or polysiloxanes, aliphatic or cycloaliphatic carbonates or polycarbonates, aliphatic or cycloaliphatic fluorocarbons or other halocarbons, aliphatic or cycloaliphatic urethane ethers, urethane esters, or urethane carbonates. In another exemplary embodiment, the R group is a low molecular weight homopolymer or copolymer that has a reactive species that is either located along the backbone of or alternatively located as a pendant group located off of the backbone.

In another embodiment, the R group contains 2 or more reactive functional groups, 3 or more reactive functional groups or 4 or more reactive functional groups. Di- and tri-acrylated groups are examples of reactive functional groups that enable UV-induced polymerization of the precursor layer.

Exemplary POSS silsesquioxane moieties are POSS silsesquioxanes functionalized with acrylate and methacrylate functionalities (e.g., MA0701—acryloisobutyl POSS, MA0702—methacrylisobutyl POSS, MA0703—methacrylate cyclohexyl POSS, MA0706—methacrylate isobutyl POSS, MA0716—methacrylate ethyl POSS, MA0717—methacrylethyl POSS, MA0718—methacrylate isooctyl POSS, MA0719—methacrylisooctyl POSS, MA0735—methacryl POSS cage mixture, MA0736—acrylo POSS cage mixture, or the like, or a combination thereof), POSS silsesquioxanes functionalized with epoxy functionalities (e.g., EP0402—epoxycyclohexylisobutyl POSS, EP0408—epoxycyclohexyl POSS cage mixture, EP0409—glycidyl POSS cage mixture, EP0417—glycidylethyl POSS, EP0418—glycidylisobutyl POSS, EP0419—glycidylisooctyl POSS, EP0423—triglycidylisobutyl POSS, EP0430—octaepoxycyclohexyldimethylsilyl POSS, EP0435—octaglycidyldimethylsilyl POSS or the like, or a combination thereof), POSSsilsesquioxanes functionalized with thiol functionalities (TH1550—mercaptopropylisobutyl POSS, TH1555—mercaptopropylisooctyl POSS, or the like, or a combination thereof), isobutyl acrylate, difunctional heterocage, isooctyl acrylate, difunctional heterocage, or a combination thereof. All of the foregoing POSS moieties are commercially available from Hybrid Plastics. POSS silsesquioxanes that are liquids or oils rather than solids (powders or waxes) include MA0718, MA0719, MA0735, MA0736, EP0408, EP0409, EP0423, EP0435, and TH1555.

The support phase precursor may be used in an amount of from about 2 wt % to about 15 wt %, based on a total weight of the precursor composition, or from about 4.7 wt % to 8.6 wt %, about 5.9 wt % to about 6.3 wt %, or less than, equal to, or greater than about 2 wt %, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or about 15 wt %.

The precursor composition may contain a light absorbing component that can selectively absorb electromagnetic radiation of a specific wavelength to decompose the polymer present in the precursor composition and to activate the support phase precursor to form the supporting structure. The light absorbing composition generally can include metallic nanoparticles or metal oxide nanoparticles that can absorb electromagnetic radiation of one or more frequencies to heat up sufficiently to degrade the second polymer while at the same time reacting the support phase precursor. In an embodiment, the support phase precursor can also react with functional reactive groups that are present on or in the light absorbing component.

The light absorbing components can include metal particles, carbonaceous particles, electrically conducting metal oxide nanoparticles, metal nanoparticles, or a combination thereof. The light absorbing component can also include precursors to the metal particles, carbonaceous particles, electrically conducting metal oxide nanoparticles, metal nanoparticles, or a combination thereof that are converted to nanoparticles upon reactions. The reaction can be induced by irradiation heat or other suitable reactions.

The particles can be nanosized or micrometer sized. There is no particular limitation to the shape of the particles, which may be for example, spherical, irregular, fractal, plate-like or whisker like. The particles may be nanosized or micrometer sized. Nanometer sized particles generally have average particle sizes of 1 to 100 nanometers, while micrometer sized particles have average sizes of greater than 101 nanometers to about 5,000 nanometers. In an example, it is desirable for the particles to be nanoparticles. The average particle sizes referred to herein are determined by the particles radius of gyration. Suitable examples of the light absorbing nanosized particles are metal particles, carbon nanotubes, graphene nanoparticles, carbon black, fullerenes, buckyballs, or the like, or combinations comprising at least one of the foregoing nanosized particles.

Metallic nanoparticles or metal oxide nanoparticles may be used as the light absorbing components, which can generate heat upon absorption of the light. As described further herein, metallic nanoparticles Metallic nanoparticles or metal oxide nanoparticles can also act as catalysts absent light absorption. Some metallic nanoparticles or metal oxide nanoparticles can act exclusively as heat producers or catalysts, while others can act as both catalysts and heat producers. These may be electrically conductive metals or alloys that do not melt under conditions used in incorporating them into the organic polymer, and fabricating finished articles therefrom. Metals such as aluminum, copper, magnesium, chromium, tin, nickel, silver, iron, titanium, gold, platinum, palladium and mixtures thereof can be incorporated into the precursor composition as conductive fillers. Physical mixtures and true alloys such as stainless steels, bronzes, and the like, may also serve as light absorbing particles.

In addition, a few intermetallic chemical compounds such as borides, carbides, and the like, of these metals, (e.g., titanium diboride) may also serve as light absorbing particles. Solid non-metallic, conductive filler particles such as tin-oxide, indium tin oxide, and the like may also optionally be added to absorb light. The solid metallic and non-metallic conductive fillers may exist in the form of powder, drawn wires, strands, fibers, tubes, nanotubes, flakes, laminates, platelets, ellipsoids, discs, and other commercially available geometries.

The light absorbing component absorbs electromagnetic radiation in a variety of different wavelengths to generate heat and degrade the polymer. The electromagnetic radiation may be visible light, ultraviolet light, microwave radiation, infrared radiation, or a combination thereof. In a preferred embodiment, the absorbed radiation may be in the visible light region of the electromagnetic spectrum.

The light absorbing component may be used in an amount of about 2 wt % to about 10 wt %, based on a total weight of the precursor composition, about 3.5 wt % to about 5.5 wt %, about 4.1 wt % to 4.5 wt %, or less than, equal to, or greater than about 2 wt %, 2.5, 3, 3.5, 4, 4.5, 5, 5.5, 6, 6.5, 7, 7.5, 8, 8.5, 9, 9.5, or about 10 wt %.

In one method of manufacturing an article that contains the precursor composition, the precursor composition may be applied to a substrate to form a precursor layer. The precursor composition may be applied to the substrate via spray painting, electrostatic spray painting, spin casting, doctor blading, dipping, or the like, or a combination thereof.

The precursor layer is then dried using elevated temperatures. The elevated temperatures may be accomplished using radiation, conduction or convection. The elevated temperatures are used to remove solvent and to facilitate phase separation of the copolymer if desired. Suitable elevated temperatures depend upon the components of the precursor composition and are about 50° C. to about 200° C., about 60° C. to about 150° C., about 70° C. to 140° C., or less than, equal to, or greater than about 50° C., 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200° C.

Following the phase separation, the substrate with the precursor layer disposed thereon is subjected to electromagnetic radiation of a desired wavelength to facilitate heating of the precursor composition. The light absorbing components in the precursor composition absorb light and heat up locally to temperatures greater than 300° C., greater than 400° C., or greater than 450° C. This localized heating promotes degradation of the second polymer (the polymer present in the precursor layer), while not affecting the first polymer (the polymer present in the substrate). The polymer present in the substrate is transparent to the incident radiation. The heating also promotes a reaction in the support phase which facilitates the forming of the porous skeletal structure which supports the hierarchical structure. The hieratical structure can be a carbon composite. The carbon composite can include one or more layers to form a carbon composite multi-layer structure. The carbon composite can also include an amorphous carbon matrix. In some examples, the carbon composite can include only one or both of the carbon composite multi-layer structure or the amorphous carbon matrix.

In some examples, the one or more layers of the carbon composite multi-layer structure can include individual elongated (graphene) layers of a graphitic material to form a graphitic multi-layer structure that can have an elongated profile (e.g., a sheet). For example, the individual layers of the carbon composite multi-layer structure can be a nanowire, a nanotube, or a nanoribbon. The width of the individual layers of the graphitic multi-layer structure can range from about 5 nanometers to about 70 nanometers, about 20 nanometers to about 50 nanometers, or less than about, equal to about, or greater than about 5 nanometers, 10, 15, 20, 25, 30, 35, 40, 45, 50, 55, 60, 65, or 70 nanometers.

The carbon composite structure can be formed through a method that includes disposing a precursor composition on a substrate. The precursor composition includes a porogen component, a carbon component, and a catalyst component. The precursor composition can be in the form of a fluid or a solid. After the precursor composition is disposed on the substrate, the precursor composition is irradiated with electromagnetic radiation. Upon irradiation, the catalyst catalyzes a reaction that grows graphitic nanowires, nanoribbons, or nanotubes, from the carbon component. Alternatively, the precursor composition can include a light absorbing species component that can act as a nanoheater to locally heat the carbon source to form the amorphous carbon matrix.

To form the carbon composite structure, the precursor composition includes a carbon component. The carbon component provides the carbon source of the graphitic nanowires, nanotubes, or nanowires. The carbon source can also be a source to grow an amorphous carbon matrix. The carbon component can range from about 5 wt % to about 50 wt % of the precursor composition, from about 20 wt % to about 40 wt %, or less than about, equal to about, or greater than about, 20 wt %, 25, 30, 35, 40, 45, or 50 wt % of the precursor composition. The carbon component can include one or more carbon containing molecules. Examples of suitable carbon containing molecules include phenol formaldehyde resin (Resol), glucose, cellulose, 4-hydroxybenozic acid, and mixtures thereof. In some examples, the carbon component includes at least one of brown sugar, barley sugar, caramel, cane sugar, corn syrup, starch, molasses, molasses raffinate (sugar waste product), glucans, galactans, xylans, and a sugar waste product. In some examples, the carbonaceous material includes powdered activated carbon, granular activated carbon, carbon black, carbon fiber, carbon honeycomb or plate structure, aerogel carbon film, pyrolysis char, or an activated carbon or regenerated activated carbon with a mass mean particle size greater than fly ash in a flue gas stream to be treated. Further examples of suitable carbon sources include any one or combination of substituted or unsubstituted hydrocarbons having any suitable number of carbon atoms, such as an substituted or unsubstituted alkane, alkene, alkyne, or a combination thereof, such as substituted or unsubstituted $(C_1$-$C_{40})$alkanes, $(C_1$-$C_{40})$alkenes, $(C_1$-$C_{40})$alkynes, $(C_4$-$C_{40})$aryls or mixtures thereof. The carbon component can be in a solid, gaseous, or aqueous phase. In sum the carbon component can include about 40 wt % carbon to about 90 wt % carbon, about 60 wt % carbon to about 80 wt % carbon, or less than about, equal to about, or greater than about 40 wt % carbon, 45, 50, 55, 60, 65, 70, 75, 80, 85 or 90 wt % carbon.

In some examples the precursor composition can also include a nitrogen source that can act a as a dopant for the carbon composite. Examples of nitrogen sources include amides (e.g., dicyandiamide), amines (e.g., glucosamine or melamine), pyrroles (e.g., polypyrrole or urea). Where present the nitrogen source can be in range of from about 0.1 wt % to about 30 wt %, about 1 wt % to about 10 wt %, or less than, equal to, or greater than about 0.1 wt %, 0.5, 1, 1.5, 2, 2.5, 3, 3.5, 4, 4.5, 5, 5.5, 6, 6.5, 7, 7.5, 8, 8.5, 9, 9.5, 10, 10.5, 10, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, or about 30 wt %.

To form the carbon composite structure, the precursor composition also includes a catalyst component. The catalyst component promotes the formation of the graphitic nanowires, nanotubes, or nanowires from the carbon component. The catalyst component can range from about 0.01 wt % to about 50 wt % of the precursor composition, about 1 wt % to about 15 wt %, or less than about, equal to about, or greater than about, 0.01 wt %, 0.5, 1, 5, 10, 15, 20, 25, 30, 35, 40, 45, or 50 wt % of the precursor composition. The catalyst component can act through a chemical reaction or the catalyst component can act as nanoheater which emits heat by absorbing electromagnetic radiation. The nonoheaters can form a amorphous carbon matrix The catalyst component includes at least one metal nanoparticle or metal oxide nanoparticle. The at least one metal nanoparticle or metal oxide nanoparticle can range from about 50 wt % to about 100 wt % of the catalyst component, about 90 wt % to about 100 wt %, less than about, equal to about, or greater than about 50 wt %, 55, 60, 65, 70, 75, 80, 85, 90, 95, or 100 wt % of the catalyst component. A metal nanoparticle or metal oxide nanoparticle of the catalyst component can have a size ranging from about 1 to about 100 nanometers, about 1 to about 50 nanometers, less than about, equal to about, or greater than about 1 nanometer, 5, 10, 15, 20, 25, 30, 35, 40, 45, 50, 55, 60, 65, 70, 75, 80, 85, 90, 95, or 100 nanometers.

The metal nanoparticle or metal oxide nanoparticle can include one or more metals. Examples of suitable metals or metal oxides include silicon, silicon carbide, iron, iron oxide, copper, nickel, palladium, platinum, ruthenium, rubidium, alloys thereof, or mixtures thereof. Examples of iron oxides include at least one of $FeO$, $Fe_2O_3$, $Fc_3O_4$, $Fe_4O_6$, $Fe_5O_7$, $Fe_{25}O_{32}$, $Fe_{13}O_{19}$, $Fe_2O_3$, $(Fe(OH)_2)$, and $(Fe(OH)_3)$.

In operation, once the precursor composition, including the carbon component and the catalyst component is deposited on the substrate, the precursor composition is irradiated with electromagnetic radiation. In some examples where the catalyst component is a metal oxide, the irradiation reduces the metal oxide to a metal. The electromagnetic radiation can be supplied through a light source. A suitable example of a light source is a xenon flash lamp. The precursor composition can be irradiated with light through a series of pulses. For example, the precursor composition can be irradiated with 1 to 20 pulses, 2 to 15 pulses, or 3 to 6 pulses. Each pulse can last from about 0.1 milliseconds to about 15 milliseconds, about 0.25 milliseconds to about 0.5 milliseconds, less than about, equal to about, or greater than about 0.1 milliseconds, 0.25, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 milliseconds. The energy of each light pulse can range from about 5500 $mJ/cm^2$ to about 7000 $mJ/cm^2$, about 6042 $mJ/cm^2$ to about 6781 $mJ/cm^2$, less than, equal to, or greater than 5500 $mJ/cm^2$, 6000, 6500, or 7000 $mJ/cm^2$.

Irradiation of the precursor composition can form at least an individual layer of the carbon composite multi-layer structure. The individual layer of the carbon composite multi-layer structure can be a composite structure including one or more of a graphitic nanowire, a graphitic nanotube, and graphitic a nanoribbon. The nanowire, nanotube, or nanoribbon are characterized by having a nanoscale width. For example, the nanowire, nanotube, or nanoribbon can have a width ranging from about 5 nanometers to about 500 nanometers, about 20 nanometers to about 50 nanometers, less than, equal to, or greater than about 5 nanometers, 10 nanometers, 15, 20, 25, 30, 35, 40, 45, 50, 55, 60, 65, or 70 nanometers. In some examples the width can be 1 micron or greater.

The nanowire, nanotube, or nanoribbon are grown from the carbon component through the catalyst component upon irradiation. Individual layers of the nanowire, nanotube, or nanoribbon are stacked on top of each other. In the final structure, at least some of the individual layers can at least partially circumscribe the metallic nanoparticles or metal oxide nanoparticles of the catalyst component.

The carbon composite structure can also include an amorphous carbon matrix. The amorphous carbon matrix can be formed through thermal conversion of some carbon sources (e.g., Resol) when nanoparticles emit heat. At suitable temperatures nanoparticles of Si can be well suited for production of an amorphous carbon matrix from Resol. The carbon composite structure can also include remaining nanoparticles from the catalytic component.

In some examples of the carbon composite structure there can be a mixture of nanowires, nanotube, and nanoribbons with the amorphous carbon. But in other examples, the carbon composite structure can include a nanoribbon, nanotube, nanoribbon, or amorphous carbon exclusively.

The carbon composite structure can be adapted for many different uses in different articles. For example, the carbon composite structure can form an anode. The anode can be part of a battery such as a lithium-ion battery. The anode can also be used in a capacitor, or other electronics such as sensors. In these examples, the carbon composite carbon multi-layer structure can range from about 0.01 wt % to about 50 wt % of the component, about 5 wt % to about 60 wt %, or less than about, equal to about, or greater than about, 0.01 wt %, 0.5, 1, 5, 10, 15, 20, 25, 30, 35, 40, 45, or 50 wt % of the component. The carbon composite structure can include additional components such as known nanoparticle additives with conductive, insulative, or capacitive functionalities.

FIG. 1, is a sectional view of battery 50 that includes the carbon composite structure. As shown in FIG. 1, battery 50 includes anode 52, separator 54, and cathode 56. Battery 50 can further include a substrate, which anode 52 is mounted on. Anode 52 can have many suitable shapes and designs. For example, anode 52 can be planar. Alternatively as shown in FIG. 1, anode 52, and thus the carbon composite structure, can form a patterned structure. The patterned structure, shown in FIG. 1, shows anode 52 in a pattern formed from a plurality of protrusions 60, which extend in a z-direction. A width W of the individual protrusions is customizable to be substantially the same between at least two protrusions 60. Alternatively, the width between at least two protrusions can be different with respect to each other. While not so limited, the width of an individual protrusion 60 can be in a range of from about 900 nm to about 900 µm, about 800 nm to about 10 µm, or less than, equal to, or greater than about 900 nm, 800 nm 700 nm, 600 nm, 500 nm, 400 nm, 300 nm, 200 nm, 100 nm, 100 µm, 200 µm, 300 µm, 400 µm, 500 µm, 600 µm, 700 µm, 800 µm, or about 900 µm.

A length in a y-direction of at least one of protrusions can be in a range of from about 1.5 times to about 20 times greater than the width, about 5 times to about 15 times, or less than, equal to, or greater than about 1.5 times, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20 times greater than the width.

As distance, or pitch, between adjacent protrusions 60 can be in a range of from about 2000 nm to about 500 µm, about 1600 nm to about 10 µm, or less than, equal to, or greater than about 2000 nm, 1900 nm, 1800 nm, 1700 nm, 1600 nm, 1500 nm, 1400 nm, 1300 nm, 1200 nm 1100 nm, 1000 nm, 900 nm, 800 nm 700 nm, 600 nm, 500 nm, 400 nm, 300 nm, 200 nm, 100 nm, 100 µm, 200 µm, 300 µm, 400 µm, or about 500 µm.

As shown in FIG. 1, protrusions 60 have a profile (viewed from the z-direction) having a square shape. However, other shapes are possible. For example a profile of protrusions 60 can be circular, ovular, or can be another polygonal shapes such as a triangle, a rectangle, a pentagon, a hexagon, a heptagon, and an octagon.

Separator 54 is disposed between anode 52 and cathode 56. Separator is shaped to generally conform to the shape of anode 52. Separator 54 includes a generally dielectric material. The dielectric material can include at least one of a polymer, microparticles, nanoparticles, and a binder. In some examples, the microparticles are in a range of from about 30 wt % to about 100 wt % of separator 54, about 90 wt % to about 100 wt % of the separator layer, or less than, equal to, or greater than about 30 wt %, 35, 40, 45, 50, 55, 60, 65, 70, 75, 80, 85, 90, 95, or 100 wt % of separator 54. The microparticles can be chosen from microparticles of polymethylurea, melamine formaldehyde resin, lithium polyacrylate, polyamide, poly(lithium 2-acrylamido-2-methylpropanesulfonate), silicon dioxide ($SiO_2$), aluminum oxide ($Al_2O_3$), pseudoboehmite (AlO(OH)), titanium dioxide ($TiO_2$), zinc oxide (ZnO), potassium fluoride (KF), lithium fluoride (LiF), zeolite and calcium carbonate ($CaCO_3$). Additionally, in some examples, the nanoparticles are in a range of from about 30 wt % to about 100 wt % of separator 54, about 90 wt % to about 100 wt % of the separator layer, or less than, equal to, or greater than about 30 wt %, 35, 40, 45, 50, 55, 60, 65, 70, 75, 80, 85, 90, 95, or 100 wt % of separator 54. The nanoparticles can be chosen from nanoparticles of silicon dioxide ($SiO_2$), aluminum oxide ($Al_2O_3$), pseudoboehmite (AlO(OH)), niobium oxide ($Nb_2O_5$), tantalum oxide ($Ta_2O_5$), titanium dioxide ($TiO_2$), zirconium oxide ($ZrO_2$), tin dioxide ($SnO_2$), zinc oxide (ZnO), potassium fluoride (KF), lithium fluoride (LiF), mesoporous aluminosilicate ($Al_2SiO_5$), a mesoporous niobium-tantalum composite oxide and a mesoporous magnesium-tantalum composite oxide. The binder can be in a range of from about 10 wt % to about 90 wt % of the separator 54, about 30 wt % to about 50 wt % of the separator layer, or less than, equal to, or greater than about 10 wt %, 15, 20, 25, 30, 35, 40, 45, 50, 55, 60, 65, 70, 75, 80, 85, or about 90 wt % of separator 54. The polymer can be chosen from any suitable polymer with dielectric properties. Examples of which can include homopolymers and copolymers of polyethylene oxide, polyacrylonitrile, polysiloxane.

The binder can include polyvinyl alcohol, carboxyl group-modified polyvinyl alcohol, polyvinyl pyrrolidone, polyethylene oxide, polypropylene oxide, polyvinylidene fluoride, polyvinylidene fluoride-hexafluoropropylene copolymer, polyacrylic acid, lithium polyacrylate, poly(methyl methacrylate), poly(butyl acrylate), ethyl hydroxyethyl cellulose, styrene-butadiene resin, carboxymethyl cellulose, polyimide, polyacrylonitrile, polyurethane, ethyl-vinyl acetate copolymer and polyester.

Cathode 56 is disposed on separator 54. Cathode 56 generally conforms to the profile of separator 54. Cathode can include a lithium oxide. The lithium oxide can be in a range of from about 50 wt % to about 100 wt % of cathode 56, about 90 wt % to about 100 wt %, or less than, equal to, or greater than about 50 wt %, 55, 60, 65, 70, 75, 80, 85, 90, 95, or 100 wt % of cathode 56. While not so limited, examples of lithium oxides include lithium cobalt oxide ($LiCoO_2$), lithium nickel oxide ($LiNiO_2$), lithium manganese oxide ($LiMn_2O_4$), and olivine lithium iron phosphate ($LiFePO_4$).

Figure 2:
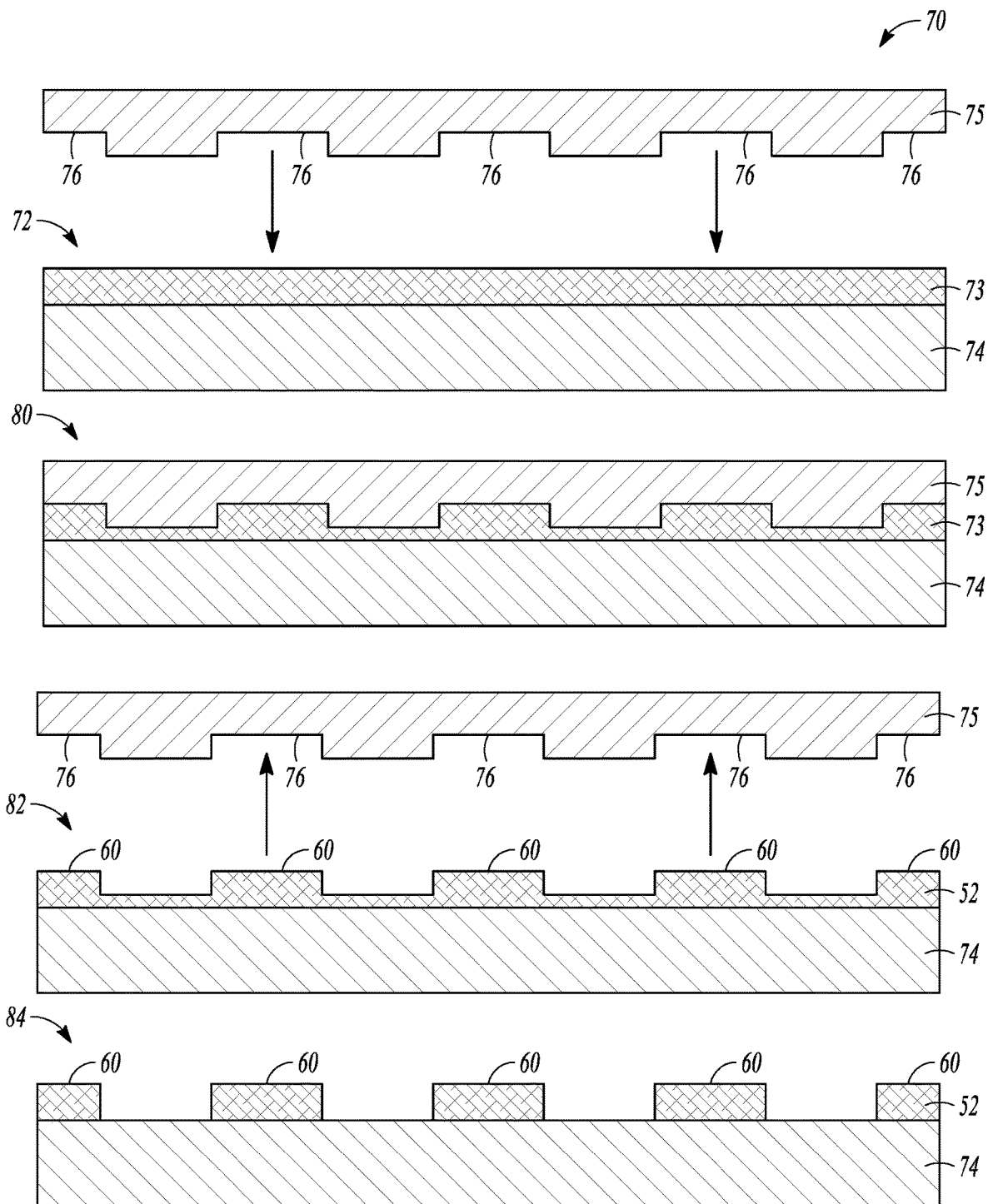
FIG. 2 is a schematic diagram showing a method of making a battery, in accordance with various embodiments.

Battery 50 can be formed by many suitable methods. An example of a suitable method is shown in FIG. 2. FIG. 2, is a schematic diagram showing a thermal nanoimprint process for forming battery 50. As shown in FIG. 2, method 70 includes operation 72. In operation 72, precursor composition 73, including at least the porogen component, carbon component, catalyst component, as described herein, is deposited on substrate 74. Mold 75 is positioned over precursor composition 73 and lowered. Mold 75 is shaped with a plurality of cavities 76, which form protrusions 60 in anode 52. Upon contact with precursor composition 73, cavities 76 form protrusions 60 thereon.

In operation 80, mold 75 is held in position on precursor composition 73. Mold 75 and optionally substrate 74 are then heated to form anode 52. The application of heat can form the carbon composite microstructures described herein. In operation 82 mold 75 is removed after sufficient heating. This leaves anode 52, including protrusions 60, formed on substrate 74. At operation 84 anode 53 is optionally processed to remove excess material. In further operations separator 54 is deposited on anode 54 and cathode 56 is deposited on separator 54. Separator 54 can be deposited or coated on anode 53 from a gaseous phase using any suitable method such as chemical vapor deposition.

In alternative examples, it is possible to deposit separator 54 on precursor composition 73 at operation 72. This can allow anode 52 and separator 54 to be formed concurrently.

Figure 3:
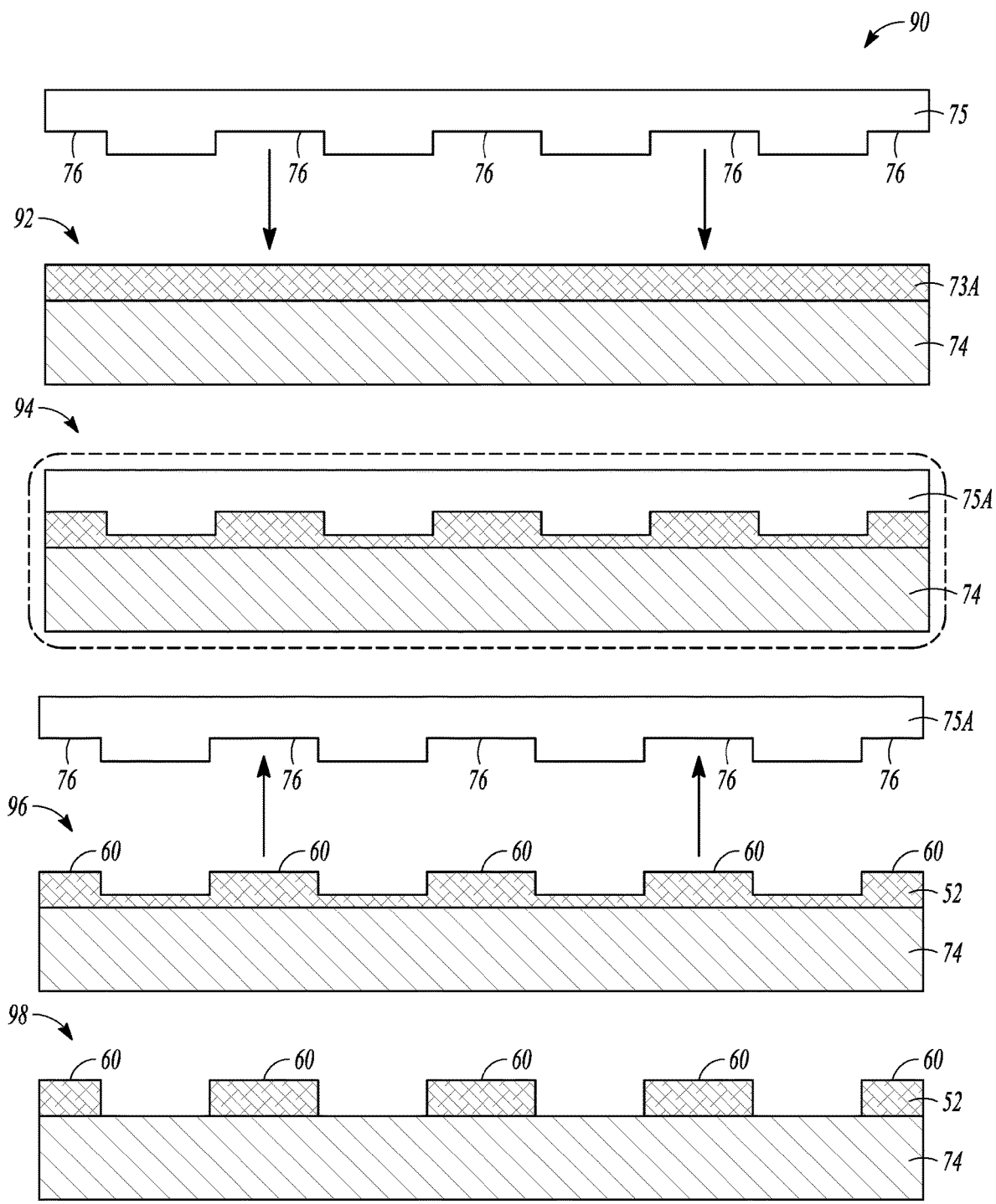
FIG. 3 is a schematic diagram showing another method of making a battery, in accordance with various embodiments.

FIG. 3, shows an alternative method for forming battery 50. FIG. 3, is a schematic diagram showing an electromagnetic radiation nanoimprint process for forming battery 50. As shown in FIG. 3, method 90 includes operation 92. In operation 92, precursor composition 73A, which is photo-crosslinkable and includes at least the porogen component, carbon component, catalyst component, as described herein, is deposited on substrate 74. Mold 75A is positioned over precursor composition 73A and lowered. Mold 75A is shaped with a plurality of cavities 76, which form protrusions 60 in anode 52. Mold 75A is substantially transparent. Upon contact with precursor composition 73A, cavities 76 form protrusions 60 thereon.

In operation 94, mold 75 is held in position on precursor composition 73. Mold 75 and optionally substrate 74 are then exposed to electromagnetic radiation (e.g., ultra violet radiation) to form anode 52. The application of electromagnetic radiation can form the carbon composite microstructures described herein. In alternative examples, mold 75A can be heated in conjunction with the exposure to electromagnetic radiation. In operation 96 mold 75 is removed after sufficient heating. This leaves anode 52, including protrusions 60, formed on substrate 74. At operation 98 anode 53 is optionally processed to remove excess material. In further operations separator 54 is deposited on anode 54 and cathode 56 is deposited on separator 54.

In alternative examples it is possible to deposit separator 54 on precursor composition 73A at operation 98. This can allow anode 52 and separator 54 to be formed concurrently.

EXAMPLES

Various embodiments of the present disclosure can be better understood by reference to the following Examples which are offered by way of illustration. The present disclosure is not limited to the Examples given herein.

Example 1 Forming Nanoporous Materials

Hierarchical nanoporous hybrid materials containing functional nanoparticles (NPs) were fabricated for a range of applications including catalysis, separation, sensing, and energy storage and conversion. The pore size within these materials can be manipulated through the self-assembly of sacrificial soft templates including small molecular surfactants and block copolymers (BCPs).

Rapid preparation of large-area hierarchical nanoporous films on flexible substrates will not only enable the fabrication of light-weight and portable devices, but also reduce the fabrication cost by employing large-scale manufacturing methods, such as roll-to-roll processing. In this Example, a simple method to realize the rapid and large-area synthesis of hierarchical nanoporous hybrid films of silica, carbon, and gold on a commercially available polyethylene terephthalate (PET) substrate via photothermal processing. The light-absorbing thin film contains gold NPs as the nanoheaters to convert light energy to heat via strong localized surface plasmon resonance (LSPR), a sacrificial (polynorbornene-graft-poly(styrene))-block-(polynorbornene-graft-poly(ethylene oxide)) (PS-b-PEO) brush BCP to create mesopores, and cross-linked polyhedral oligomeric silsesquioxane (POSS) as the silica source to form the skeleton of the porous structure. The PS-b-PEO brush BCP ($M_n$=1583 kg/mol, PDI=1.06, $f_{PEO}$=48.4 wt %) was synthesized by sequential ring opening metathesis polymerization (ROMP) according to our reported synthetic procedure. The molecular weights of the PS and PEO side chains are 3.5 and 2.0 kg/mol, respectively. Gold NPs with diameter of approximately 2 nm were coated with 4-mercaptophenol which exhibits strong hydrogen bonding interactions with the PEO domain. The thin film was prepared over large areas by rod coating and by thermal annealing to enable the ripening of NPs to larger sizes (>10 nm) as well as to initiate crosslinking of POSS. A strong LSPR peak at 543 nm was observed after annealing, providing high light-absorbing efficiency in the film for subsequent photothermal processing. For comparison, no obvious LSPR can be indentified for the unannealed sample containing small NPs (2 nm). Crosslinking of POSS cages was achieved via imide formation between carboxylic acid and secondary amine groups on POSS upon heating, which was verified by fourier-transform infrared spectroscopy (FTIR). Sphere-like morphologies were formed via self-assembly during solvent evaporation with PS appearing as the spheres and gold NP/POSS incorporated PEO domain as the matrix. This was confirmed by small angle X-ray scattering (SAXS), field emission scanning electron microscopy (FESEM), and cross-sectional trasmission electron microscopy (TEM) of thin sections from the annealed sample. Because PS and PEO in unstained samples have similar electron densities, the contrast observed in the TEM image is due to the gold NPs and POSS residing exclusively in PEO domains. The domain spacing of the spherical structure is approximately 84 nm as determined by SAXS. To create well-defined porous structures, the BCP template is removed and the crosslinked POSS matrix is oxidized to silica upon heating.

For the photothermal processing, the emission of light is in a wide wavelength range from 200 to 1000 nm with the peak intensity between 400 and 500 nm. The light intensity is precisely tunable through the variation of voltage and/or pulse duration time. The optimal process includes three repeats of a same pulse with a duration for 0.3 milliseconds. FTIR spectra of four representative samples, including a control sample without photothermal processing, and samples 1-3 obtained using different pulse energies of 1785, 1837 and 1891 mJ/cm$^2$, respectively. The multiple absorption peaks in the range from 1800 to 1200 cm$^{-1}$ are ascribed to organic components and gradually disappeared with the increase of pulse energy. The removal of organics was also confirmed by the peaks missing in the range from 3100 to 2800 cm$^{-1}$ corresponding to C—H stretch. A blue shift of the O—Si—O stretching peak was observed as the pulse energy increased, indicating the opening and oxidation of POSS cages to a network-like silica structure. In contrast, no evident changes in FTIR and no evidence of a nanoporous structure in FESEM images were observed for samples without gold exposed to the xenon flash lamp using the same pulse energies suggesting that the gold NPs enabled the conversion of light energy to heat for the creation of nanoporous structures. The oxidation of POSS was further confirmed by a small change in the binding energy of the 2p obital of silicon (Si) between the control sample and sample 3 (102.2 vs 103.0 eV) according to X-ray photoelectron spectroscopy (XPS). Generally, there are significant increases in the weight percentages of silica (11.2 vs 37.3 wt %), carbon (0 vs 18.0 wt %) and gold NPs (23.3 vs 43.0 wt %) with increased pulse energy, while a remarkable decrease of organic residues was observed from 65.5 wt % to 1.70 wt % indicating the high efficiency of our synthetic method. It is worthy to note that an abnormal increase of silica weight percentage was observed when changing pulse energy from 1837 to 1891 mJ/cm$^2$. This can be best explained by the large number of POSS cages oxidized in air at a higher light intensity, which is consistent with an evident blue shift of the O—Si—O stretching peak observed in FTIR as well as the XPS data. This is also the reason why gold weight percentage decreased from 46.7 to 43.0 wt %. The efficient oxidation of POSS cages enables the creation of highly porous hybrid materials with good mechanical properties. In addition, the hybrid materials containing high concentrations of gold NPs exhibit strong LSPR, which is useful for many potential applications including, sensing. A blue shift of the LSPR peak was observed for samples after photothermal treatments indicating the high sensitivity of gold NPs to their surrounding chemical environment (organics vs air/silica/carbon), which is promising for sensor applications.

The porous structures of samples 1-3 were characterized by FESEM and TEM. The pore size was obtained via image analysis of more than 400 pores using ImageJ. Well-controlled uniform pores ranging from approximately 44 to 48 nm were formed on the surface of the resulting hybrid coatings during a rapid photothermal processing on the order of millisecond scale. For comparison, a random porous structure was observed in a sample prepared using a PEO homopolymer as the template, suggesting that the nanoporous structure was formed via replicating the sphere-like morphology of the self-assembled BCP nanocomposites. Interestingly, a foam-like porous structure with interconnected macropores of more than 50 nm was observed under the surface of sample 3 as indicated by cross-sectional FESEM micrographs. This likely results from the rapid liberation of gaseous products during photothermal processing. A similar porous structure was also observed in some small cracked areas on the surface where large amounts of gases were released. For comparison, material under the film surface is less porous for samples 1 and 2. In addition, the connections between surface pores and the macropores below can be clearly seen in FESEM micrographs at high magnifications. The high loading of gold NPs (43.0 wt %) are well dispersed in the skeleton of the porous structure without aggregation. The hierarchical porous structure with large surface pores obtained may facilitate the penetration of large biological molecules for separation or sensing applications.

Energy dispersive X-ray spectrometry (EDS) for TEM was used to further verify the elemental distribution in the porous structure of sample 3. TEM shows the high-angle annular dark-field scanning TEM (HAADF-STEM) micrograph of an area for EDS mapping, where gold NPs appear as the bright regions in the image. Silicon (Si), oxygen (O), carbon (C), and gold (Au) are confirmed in the EDS spectrum consistent with XPS results. A uniform distribution of all elements in the porous film, providing a route to hybrids with unique physical properties was observed.

In summary, Example 1 provides a robust strategy for the synthesis of large-area nanoporous hybrid films on flexible substrates by rapid photothermal processing. This method enables the selective heating of only top coatings without damaging the polymer substrate. In comparison with the laser writing, this technique has a great advantage in making large-area films, which is compatible with roll-to-roll manufacturing. In addition, a hierarchical porous structure with large mesopores on the surface and foam-like macropores underneath was created in a short time of less than a millisecond. The hybrid films containing high concentrations of gold NPs in the unique porous structure may find applications in sensors and catalysis. This strategy can be transferred to the synthesis of a variety of different porous hybrid films containing a broad range of functional additives that have high surface areas and well controlled pore sizes for many applications including supercapacitors, sensors, filtration, and catalysis.

Example 2 Forming Graphitic Layers

Mesoporous carbon or its hybrid materials exhibit many attractive features including high specific surface area, well-controlled pore size, high conductivity and chemical stability, and can be of interest for a variety of important applications in separation, catalysis, sensing, and energy storage. Block copolymers (BCPs) and small molecular surfactants can be used as sacrificial templates to generate mesoporous structures with tunable morphology, pore size, and porosity. The obtained nanoporous structures are the attractive supports for various functional materials including noble metals or metal oxide nanoparticles (NPs) which can greatly improve device performances such as the capacity of a lithium ion battery.

For the architecture of mesoporous carbon or hybrids, membranes of a few to tens of micron meters thick are of great importance for practical uses in optical, electronic, electrochemical, and sensing devices. Methods for the preparation of mesoporous carbon can require carbonization and graphitization in an inert atmosphere at high temperatures (>800° C.) for several hours. The harsh conditions can result in significant challenges for the industrial-scale fabrication via roll-to-roll processing. Laser beam writing has been employed to synthesize porous carbon on silicon wafers, and the substrate absorbs light energy and heat the top films to enable carbonization. However, a further heating in furnace can be required to graphitize the films to some extent, and this method cannot be used to fabricate carbon membranes on low temperature substrates. While a one-step approach for producing and patterning porous graphene films by heating polyimide using $CO_2$ infrared laser has been reported, the mesoporous structure of the obtained carbon was not controlled, and only a few polymer materials can absorb light efficiently for carbonization. For both cases, no functional additives can be incorporated within the porous structures to greatly enlarge the utility of porous carbon. In addition, it remains challenging to realize rapid, large area preparation of mesoporous membranes using laser due to the limited beam size.

In this Example it is demonstrated that large area porous silica can be prepared via rapid photothermal processing through submillisecond light pulses from a xenon flash lamp. However, the obtained materials are not conductive and cannot be used as electrodes in real applications such as lithium ion batteries. This Example illustrates that large-area mesoporous hybrid carbon membranes on polymer and metal substrates containing gold or iron/iron oxide can be readily fabricated using the photothermal processing method.

This fabrication scheme allows for the selective carbonization of light-absorbing films in mild conditions, which is compatible with industrial scale processing methods, such as roll-to-roll manufacturing. Advantageously, dense graphitic nanowires can be created during the rapid heating process likely with iron NPs as the catalyst for nanowire growth. The iron NPs can be produced by reducing iron oxide NPs at an initial stage of heating and then be oxidized to iron oxide in the final products, depending on different photothermal treatments. The obtained hybrid materials can be anodes for lithium ion batteries due to several attractive features including high surface areas of the mesoporous structures, high energy density contributed by iron oxide NPs, high conductivity from graphitic nanowires as well as good integrity (binder free) of the films, and good mechanical properties provided by an amorphous carbon matrix.

A (polynorbornene-graft-poly(styrene))-block-(polynorbornenc-graft-poly(ethylene oxide)) (PS-b-PEO) brush BCP is used as a template for the creation of well-controlled pores via rapid self-assembly. For the gold system, both the NPs (~2 nm) coated with 4-mercaptophenol and the resol are selectively incorporated within the PEO domain driven by hydrogen bonding interactions, affording a spherical morphology with PS as the spheres and PEO/gold/resol as the matrix. The bcc spherical morphology was verified by small angle X-ray scattering (SAXS), and the domain spacing is approximately 79 nm ($d=2\pi/q$). Transmission electron microscopy (TEM) of the sample confirmed the gold NPs were well-dispersed within the nanocomposite film. The strong localized plasmonic resonance (LSPR) of gold NPs at 610 nm was observed in absorption spectrum of the annealed sample, enabling efficient light absorption during the subsequent photothermal processing. Prior to photothermal treatments, thermal gravimetric analysis was employed to disclose the thermal decomposition in air, indicating approximately 24 wt % of gold in the mixture. The light energy density is precisely tunable through the variation of voltage and/or pulse duration time. For optimal experiments regarding films on ITO-PET, the pulse duration time was fixed at 0.3 milliseconds and the light intensity was tuned simply by changing the applied voltage. This process includes three repeats of a same light pulse with a time interval of one second.

Fourier-transform infrared (FTIR) spectra of samples before and after photothermal treatments using light pulses with an energy density of 1582 mJ/cm$^2$ showed that all the absorption peaks ascribed to organic components are not present after the photothermal processing, indicating that nearly complete carbonization was achieved in a heating period less than a millisecond. Raman spectrum of the obtained carbon sample shows overlapped D (1306 cm$^{-1}$) and G (1569 cm$^{-1}$) peaks, which is similar to that of amophous carbon prepared using furnace carbonization. This was further confirmed by high resolution TEM and X-ray diffraction (XRD) spectrum. Field emission scanning electron microscopy showed uniform mesopores formed in surface area of the carbon membrane where the gold NPs or clusters appear as the bright regions. The pore size is approximately 41 nm according to image analysis using ImageJ, which is significantly larger than that of mesoporous materials prepared using linear BCPs. Of course pore size and shape can be tuned by adjusting the composition of the BCP nanocomposites. A cross-sectional SEM shows a well-controlled porous structure inside the carbon membrane by replicating the spherical morphology of the precursor composition. The mesoporous structure containing high loading of well-dispersed gold NPs was further characterized by TEM. In addition, energy dispersive X-ray spectrometry (EDS) was used to further verify elemental compositions (~53 wt % gold) and distribution in the mesoporous structure.

Mesoporous carbon membranes on metal surfaces can be used as binder-free electrodes for supercapacitors, batteries, and sensors, wherein the metal substrates serve as charge collectors. Aluminum foils were first chosen to demonstrate the rapid creation of mesoporous carbon/gold membranes by photothermal processing. Six repeats of light pulses with different energies from 6042 to 6781 mJ/cm$^2$ were used for the preparation of carbon membranes. Carbon content increases first and then decreases with the highest carbon percentage at 98.5% and the lowest oxygen level of 1.45% in the sample obtained with a light energy of 6331 mJ/cm$^2$. The sheet resistance decreases significantly from 67.1 to 16.7 kΩ with the increased light intensity from 6042 to 6781 mJ/cm$^2$. SEM micrographs of a sample prepared with a light energy density of 6478 mJ/cm$^2$ shows a large area of the carbon membrane of up to 3 μm thick obtained on aluminum surface. An interesting hierarchical porous structure was verified from cross-sectional SEM. The surface area shows a foam-like layer of approximately 300 nm thick on top of a uniform mesoporous sublayer with an average pore size of about 31 nm.

To explore the generality and scalability of the photothermal method, gold was replaced with low-cost iron/iron oxide NPs (~7 nm) as the nanoheaters for carbonization. A simulation software, SimPulse, for the photothermal processing system allows for a brief assessment on temperatures that can be reached by different materials when treated with strong light pulses. Iron oxide turned out to achieve a much higher temperature than that of gold. Additionally, iron oxide exhibits a high theoretical energy density (~1000 mAh/g) when used as anodes for lithium ion batteries. The precursor compositions were prepared on nickel foils. Similar to gold system, iron/iron oxide NPs coated with 4-hydroxybenzoic acid (HBA) are selectively incorporated within the PEO domain of the PS-b-PEO BCP via hydrogen bonding. A spherical morphology was observed in cross-sectional SEM of the precursor composition. TGA indicates multisteps of decomposition of the precursors with approximately 24 wt % of iron oxide left. Light pulses with an energy of 6572 mJ/cm$^2$ were selected for optimal photothermal treatment. Different repeats (4, 8, 12) of the light treatment were used to disclose different stages of carbonization.

FTIR spectra indicate incomplete carbonization in the sample treated with 4 repeats, while complete carbonization can be achieved by more repeats (8 and 12). The sheet resistance decreased significantly from 180 to 0.29 kΩ with the increased pulses indicating efficient carbonization achieved during the rapid photothermal heating.

Figure 4:
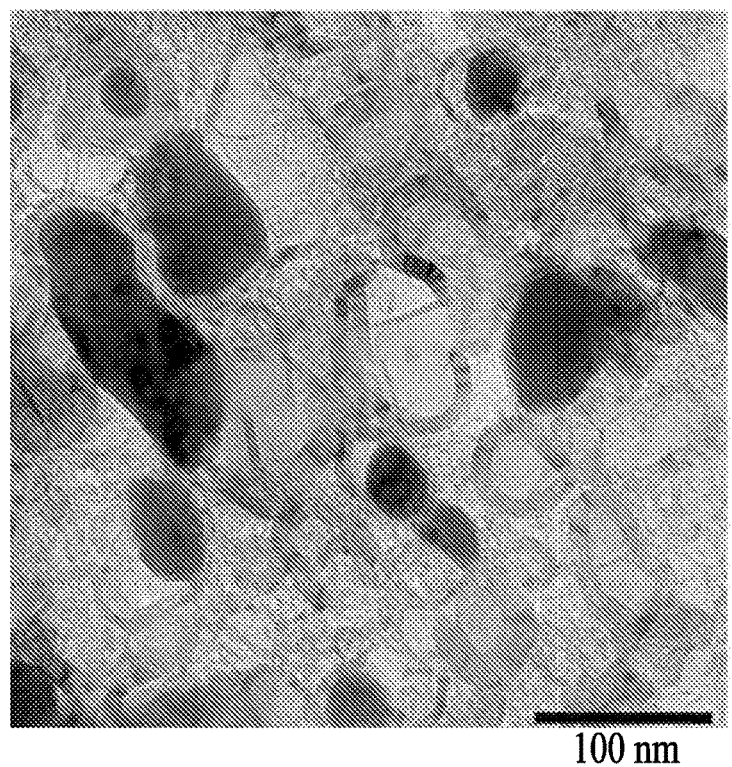
FIG. 4 is a transmission electron microscopy image showing a sample, in accordance with various embodiments.
Figure 5:
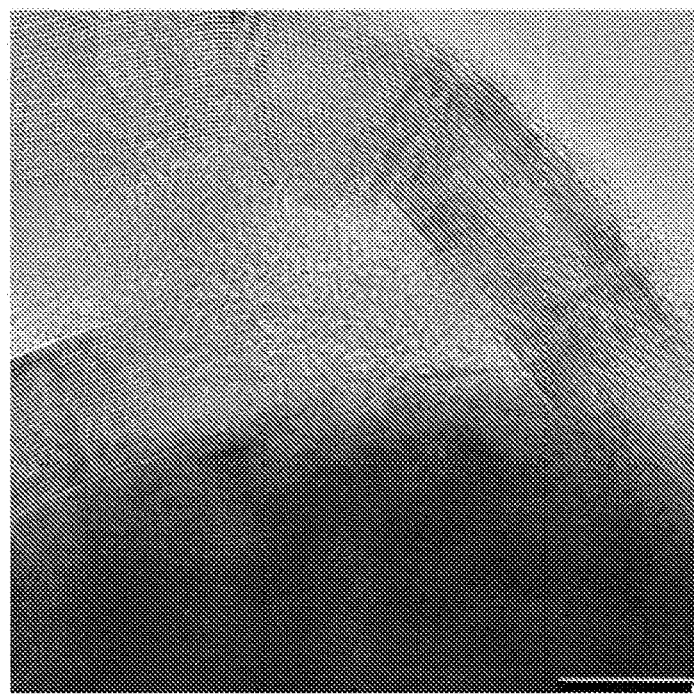
FIG. 5 is a transmission electron microscopy image showing a sample, in accordance with various embodiments.
Figure 6:
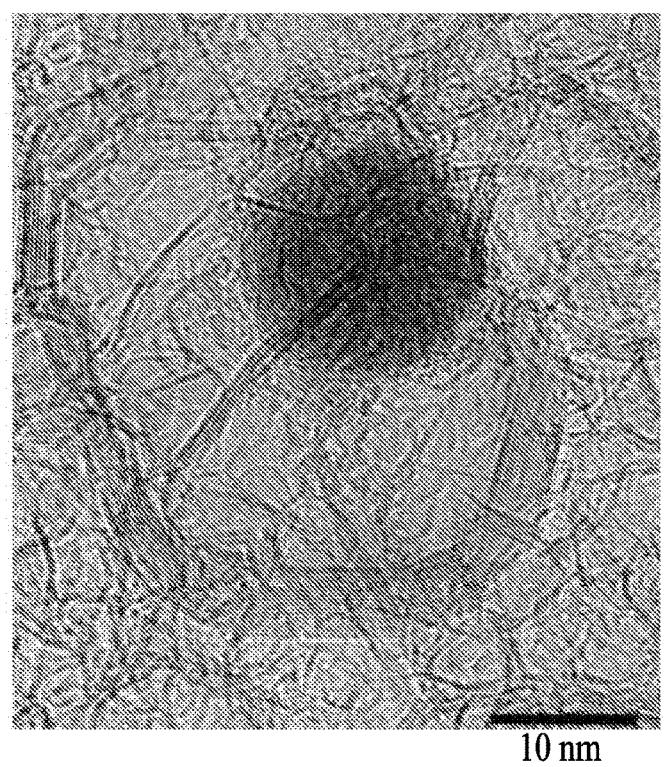
FIG. 6 is a transmission electron microscopy image showing a sample, in accordance with various embodiments.

The iron oxide (γ-Fe$_2$O$_3$) was confirmed using X-ray diffraction (XRD). SEM showed a foam-like structure on the top surface as well as a well-defined porous structure underneath originated from the BCP morphology. As shown in FIG. 4, network-like carbon nanowires are evident in TEM decorated with the iron/iron oxide NPs, consistent with the wire-like features observed in SEM. As shown in FIG. 5, high resolution TEM shows a well-ordered graphitic structure in the nanowires with a lattice spacing of 0.32 nm, which is very close to the layer spacing (0.33 nm) between perfectly packed graphene sheets. The graphitic nanowires are likely generated with the iron NPs as the catalyst during the millisecond heating process, similar to the mechanism of carbon nanotube growth from iron NPs. FIG. 6 shows dense carbon wires around a NP consisted of a single to more than ten layers of graphene. The photothermal method in this work provides a simple route to rapid, scalable and low-cost manufacturing of graphitic carbon materials for many important applications including lithium ion batteries.

The hybrid mesoporous carbon films are tested as the anodes for lithium ion batteries. A super high energy density of more than 800 mAh/g was observed at a current density of 70 mA/g for the first discharge cycle, suggesting a high surface area of the anode as well as the efficient lithium ion transport within the binder-free anode. The initial galvanostatic cycling test confirmed the stable performance of the anode with a high specific capacity of approximately 948 mAh/g which is among the highest numbers reported. For comparison, some methods for the preparation of mesoporous carbon can require carbonization and graphitization in an inert atmosphere at high temperatures (>800° C.) for several hours. The harsh conditions result in significant challenges for the industrial scale fabrication via roll-to-roll processing. Typically, graphite powders prepared using conventional methods need to be mixed with a polymer binder for preparing coatings on metal surfaces for lithium ion batteries. However, the polymer binder can decrease film conductivity as well as block the porous pathways for lithium transport. The reported method here provides a cost-effective route to industrial scale productions of high performance anode hybrid materials for lithium ion batteries.

Figure 7:
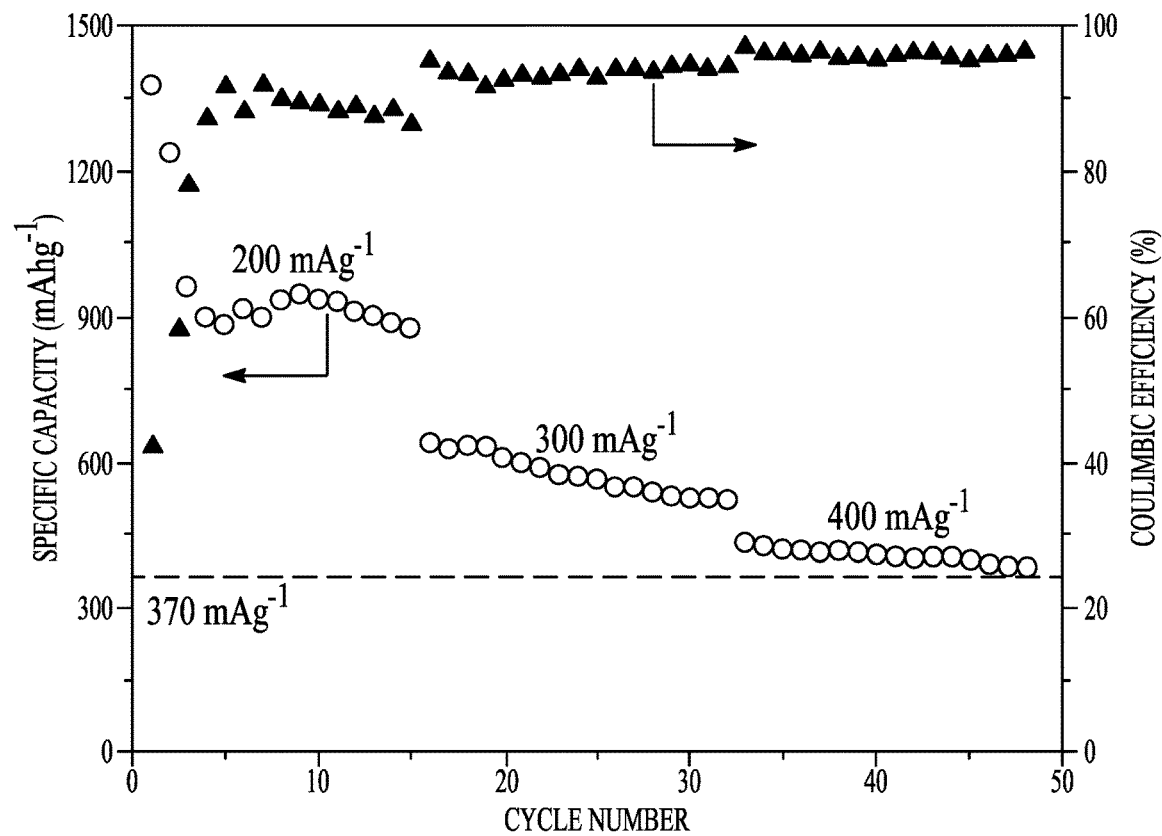
FIG. 7 is a graph showing rate performance and coulombic efficiency for 50 cycles of charge/discharge under varied cycling currents of an anode, in accordance with various embodiments.

The materials were tested as the anodes for lithium ion batteries. A distinct lithiation plateau at 0.8 V (vs Li/Li$^+$) was demonstrate, which indicated good reactivity of iron oxide. Under the current of 200 mAg$^{-1}$, the composite electrode exhibited specific capacity as high as 1550 mAhg$^{-1}$ for the 1$^{st}$ discharge. This high capacity, together with the relatively low Columbic efficiency, shown in FIG. 7, indicated the high surface area of the porous composite and the resultant parasitic irreversible reactions at the interfaces. These reactions included the solid electrolyte interface (SEI) formation, and possibly the corrosion-like reactions of the carbon matrix. The capacity of composite electrode quickly stabilized after the initial 4-5 lithiation/dilithiation cycles and generated a specific capacity approximately 900 mAhg$^{-1}$, which as among the highest values among all reported capacities for carbon/ferrite based electrodes. The observed graphitic carbon layers wrapped around the particles serve as a flexible cage to accommodate the volume change of iron oxide and help the particles stay connected to the amorphous carbon matrix. As current density increased to 300 mAg$^{-1}$ and 400 mAg$^{-1}$, the electrode demonstrated capacities of 600 mAhg$^{-1}$ and 450 mAhg$^{-1}$. Compared to other electrode materials that can be produced in large scale, e.g. graphite, the capacity of carbon/iron/iron oxide composite under real test far exceeds the theoretical capacity of graphite (370 mAhg$^{-1}$). The method and materials described herein provided an effective route to industrial scale production of high-performance, binder-free anode for lithium ion batteries and other batteries.

Example 3 Forming Battery with Patterned Anode

Commercial FeO$_x$ nanoparticle water dispersion (30-100 nm particle size, 20 wt %, Sigma Aldrich) was first solvent exchanged to dimethylformamide (DMF) dispersion. DMF and original dispersion were mixed in 1:1 v/v ratio. The mixture was then put under nitrogen flow overnight to enable water evaporation. The exchanged dispersion was roughly 20 wt % FeO$_x$ in DMF. Commercial Novolac phenolic resin (acid catalyzed) and Pluronic 127 surfactant were dissolved separately in DMF to reach solid concentration around 100 mg/ml. The FeO$_x$/carbon precursor ink was prepared by simply mixing the three parts together in a weight ratio of FeO$_x$:phenolic resin:Pluronic 127=5:1:1. The mixture was shortly bathed, sonicated, and stir bar mixed for 30 min.

Glass substrates were cleaned with deionized water and dried in nitrogen flow. A precursor mixture including iron oxides phenolic resin, pluronic 127 and dimethyl fumarate (mass ratio of 5:1:1:45) was spin coated onto the glass substrates (800 rpm, 30 s) in glove box with 4% relative humidity. In other examples the precursor mixture could be solvent free and include iron oxides phenolic resin, and pluronic 127 (mass ratio of 5:1:1). A mold formed of poly (dimethylsiloxane) (PDMS) stamp was then placed onto the film. The targeted imprint dimension on the mold was an array of line pattern, with 2 µm in width, 4 µm in height and 10 µm in pitch. After a short-time heating on hot plate at 60° C., the PDMS stamp was peeled off and the imprint was transferred into the oven and baked at 120° C. for another 1 hour to enable phenolic resin crosslinking.

Where the precursor mixture can be photocured, the mold was transparent and photothermal processing was carried out on a Novacentrix Pulse forge 1300 photonic curing system. The pulse duration time was fixed at 0.6 milliseconds and the voltage at 500 V was applied affording an optimal light energy at 4800 mJ/cm$^2$. This process included three repeats of a same light pulse with a time interval of one second.

Example 4 Forming Anode and Separator Bilayer

Commercial FeO$_x$ nanoparticle water dispersion (30-100 nm particle size, 20 wt %, Sigma Aldrich) was first solvent exchanged to dimethylformamide (DMF) dispersion. To do this, DMF and original dispersion are mixed in 1:1 v/v ratio. The mixture was then put under nitrogen flow overnight to enable water evaporation. The exchanged dispersion is roughly 20 wt % FeO$_x$ in DMF. Commercial Novolac phenolic resin (acid catalyzed) and Pluronic 127 surfactant are dissolved separately in DMF to reach solid concentration around 100 mg/ml. The FeO$_x$/carbon precursor ink was prepared by mixing the three parts together. In one demonstration, the weight ratio of FeO$_x$:phenolic resin:Pluronic 127 is 5:1:1. The mixture was shortly bath sonicated and stir bar mixed for 30 min.

Alternatively, if alkali catalyzed phenolic resin (Resole Phenolics) were used, then all parts were dissolved in water/ethanol. The preparation follows the same procedure as described in Example 3. FeO$_x$ water dispersion can be used as received.

The separator layer included Aerosil 200, a hydrophilic fumed silica with surface area of 175-225 m$^2$/g and supplied by Evonik Corp., and was dispersed in water with high shear. 2-8% clear and uniform dispersion is obtained with thixotropic rheology suitable for imprinting. This layer is also mostly transparent to the light spectrum of Pulse Forge 1300.

The bilayer imprinting included spin coating the precursor film on indium/tin oxide (ITO) coated glass. The as-cast precursor film is placed on a 60° C. hot plate for 5 min. Upon heating, the ink solid concentration increased as solvent evaporates. This caused rapid increase in ink viscosity. After that, composite electrolyte was cast onto the annealed film. The bilayer film is heated on the plate for another 5 min to concentrate the upper layer. The film was then transferred into the Nanonex imprinting system and a high modulus mold (h-PDMS or PTFE) was placed onto the bilayer film. The imprinting was held at 110° C. for 5 min under pressure followed by demolding. Alternatively, or in addition to heating the mold the bilayer was photothermally processed.

The photothermal processing was carried out on a Novacentrix Pulse forge 1300 photonic curing system. The light intensity was tuned by changing applied voltage and/or pulse duration time. In one demonstration, the pulse duration time was fixed at 0.6 milliseconds and the voltage at 500 V was applied affording an optimal light energy at 4800 mJ/cm$^2$. This process included three repeats of a same light pulse with a time interval of one second. Lower energies led to large amounts of organic residue in the product, while a higher energy could break the imprinted pattern.

The anode separator bilayer was used to assemble a battery. To assembly the battery a counter electrode (cathode) slurry was prepared by mixing commercial LiCoO$_2$, carbon black and PVDF binder in an 8:1:1 ratio in NMP followed by bath sonication. The slurry was cast and planarized to the bilayer structure. This formed an interdigitated cathode/anode array. An aluminum charge collector was then sputtered onto the LiCoO$_2$ cathode. The galvanostatic charge/discharge of the full cell was tested by a commercial potentiostat (Maccor 4304) Lithium perchlorate (LiClO$_4$) or lithium hexafluorophosphate (LiPF$_6$) in ethylene carbonate (EC)/dimethyl carbonate (DMC) mixture solvent (1/1 v/v) which was used as liquid electrolyte. Capacities at 0.1 C to 10 C were measured.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

ADDITIONAL EMBODIMENTS

The following exemplary embodiments are provided, the numbering of which is not to be construed as designating levels of importance:

Embodiment 1 provides a method of forming a composite comprising a carbon composite structure, the method comprising:
  disposing a precursor composition on a substrate, the precursor composition comprising at least one of:
    a porogen component,
    a support phase precursor component;
    a carbon component,
    a light absorbing component; and
    a catalyst component; and
  irradiating the precursor composition to form at least one of:
    a carbon composite multi-layer structure having a substantially elongated profile;
    and an amorphous carbon matrix.

Embodiment 2 provides the method of Embodiment 1, wherein the substrate comprises at least one of a metal and a polymer.

Embodiment 3 provides the method of Embodiment 2, wherein the metal is at least one of aluminum, nickel, and copper.

Embodiment 4 provides the method of any one of Embodiments 1-3, wherein the substrate comprises a conductive material.

Embodiment 5 provides the method of any one of Embodiments 1-4, wherein the substrate is substantially rod-shaped.

Embodiment 6 provides the method of any one of Embodiments 1-5, wherein the substrate comprises a metallic foil.

Embodiment 7 provides the method of any one of Embodiments 1-6, wherein the foil comprises at least one of aluminum, nickel, and copper.

Embodiment 8 provides the method of any one of Embodiments 1-7, wherein the substrate comprises a first polymer.

Embodiment 9 provides the method of Embodiment 8, wherein the first polymer component ranges from about 50 wt % to about 100 wt % of the substrate.

Embodiment 10 provides the method of Embodiment 8, wherein the first polymer ranges from about 90 wt % to about 100 wt % of the substrate.

Embodiment 11 provides the method of any one of Embodiments 1-10, wherein the porogen component ranges from about 5 wt % to about 50 wt % of the precursor composition.

Embodiment 12 provides the method of any one of Embodiments 1-11, wherein the porogen component ranges from about 20 wt % to about 40 wt % of the precursor composition.

Embodiment 13 provides the method of any one of Embodiments 1-12, wherein the porogen component comprises a second polymer.

Embodiment 14 provides the method of Embodiment 13, wherein the second polymer ranges from about 1 wt % to about 100 wt % of the porogen component.

Embodiment 15 provides the method of Embodiment 13, wherein the second polymer component ranges from about 90 wt % to about 100 wt % of the porogen component.

Embodiment 16 provides the method of Embodiment 13, wherein at least one of the first polymer and the second polymer are a thermoplastic polymer, a thermosetting polymer, or a mixture thereof.

Embodiment 17 provides the method of Embodiment 13, wherein at least one of the first polymer and the second polymer is chosen from polyacetals, polyacrylics, polycarbonates, polystyrenes, polyesters, polyamides, polyamideimides, polyarylates, polyacrylates, polymethylmethacrylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, polyolefins, polyacrylamides, epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, unsaturated polyesterimides, and a mixture thereof.

Embodiment 18 provides the method of Embodiment 13, where the second polymer is poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-1-butyl (meth)acrylate), poly(methyl methacrylate-b-t-butyl methacrylate), poly(ethylene oxide-b-propylene oxide), poly(styrene-b-tetrahydrofuran), poly(styrene-b-isoprene-b-ethylene oxide), poly(styrene-b-dimethylsiloxane), poly(styrene-b-trimethylsilylmethyl methacrylate), poly (methyl methacrylate-b-dimethylsiloxane), poly (methyl methacrylate-b-trimethylsilylmethyl methacrylate), or a mixture thereof.

Embodiment 19 provides the method of Embodiment 13, where the second polymer is a graft block copolymer comprising two blocks, wherein each block has a polymer backbone and different graft polymers covalently bonded to the polymer backbone.

Embodiment 20 provides the method of Embodiment 19, where the graft block copolymer comprises (polynorbornene-graft-poly(styrene))-block-(polynorbornene-graft-poly(ethylene oxide))).

Embodiment 21 provides the method of any one of Embodiments 1-20, wherein the carbon component ranges from about 5 wt % to about 50 wt % of the precursor composition.

Embodiment 22 provides the method of any one of Embodiments 1-21, wherein the carbon component ranges from about 20 wt % to about 40 wt % of the precursor composition.

Embodiment 23 provides the method of Embodiment 22, wherein the carbon component comprises at least one of a substituted or unsubstituted $(C_1-C_{40})$alkyl, $(C_1-C_{40})$alkenyl, $(C_1-C_{40})$alkynyl, $(C_4-C_{40})$aryl and mixtures thereof.

Embodiment 24 provides the method of Embodiment 22, wherein the carbon component is in a gaseous, solid, or liquid phase.

Embodiment 25 provides the method of Embodiment 22, wherein the carbon component comprises about 40 wt % carbon to about 90 wt % carbon.

Embodiment 26 provides the method of any one of Embodiments 1-25, wherein the catalyst component ranges from about 0.01 wt % to about 50 wt % of the precursor composition.

Embodiment 27 provides the method of any one of Embodiments 1-26, wherein the catalyst component ranges from about 1 wt % to about 15 wt % of the precursor composition.

Embodiment 28 provides the method of any one of Embodiments 1-27, wherein at least one of the catalyst component and the light absorption component comprises at least one metal or metal oxide nanoparticle.

Embodiment 29 provides the method of Embodiment 28, wherein the at least one metal or metal oxide nanoparticle ranges from about 50 wt % to about 100 wt % of the catalyst component and the light absorption component.

Embodiment 30 provides the method of Embodiment 28, wherein the at least one metal or metal oxide nanoparticle ranges from about 90 wt % to about 100 wt % of the catalyst component and the light absorption component.

Embodiment 31 provides the method of Embodiment 28, wherein the metal or metal oxide nanoparticle has a size ranging from about 1 to about 100 nanometers.

Embodiment 32 provides the method of Embodiment 28, wherein the metal or metal oxide nanoparticle has a size ranging from about 1 to about 50 nanometers.

Embodiment 33 provides the method of Embodiment 28, wherein the metal or metal oxide nanoparticle comprises silicon, silicon carbide, iron, iron oxide, copper, nickel, palladium, platinum, ruthenium, rubidium, alloys thereof, or mixtures thereof.

Embodiment 34 provides the method of Embodiment 33, wherein the iron oxide is at least one of $FeO$, $Fe_2O_3$, $Fe_3O_4$, $Fe_4O_6$, $Fe_5O_7$, $Fe_{25}O_{32}$, $Fe_{13}O_{19}$, $Fe_2O_3$, $(Fe(OH)_2)$, and $(Fe(OH)_3)$.

Embodiment 35 provides the method of any one of Embodiments 1-34, wherein the precursor composition is irradiated with electromagnetic radiation.

Embodiment 36 provides the method of any one of Embodiments 1-35, wherein the electromagnetic radiation is supplied by a xenon flash lamp.

Embodiment 37 provides the method of any one of Embodiments 1-36, wherein and individual layer of the carbon composite multi-layer structure comprises at least one of a nanowire, a nanotube, a nanoribbon, the amorphous carbon matrix, and the metal or metal oxide nanoparticle.

Embodiment 38 provides the method of Embodiment 37, wherein the at least one nanowire, nanotube, and nanoribbon have a width ranging from about 5 nanometers to about 500 nanometers.

Embodiment 39 provides the method of Embodiment 37, wherein the at least one nanowire, nanotube, and nanoribbon have a width ranging from about 20 nanometers to about 50 nanometers.

Embodiment 40 provides the method of any one of Embodiments 1-39, wherein the individual layer of the carbon composite multi-layer structure circumscribes at least one of the catalyst component and the light absorption component.

Embodiment 41 provides the method of any one of Embodiments 1-40, wherein at least one of the carbon composite multi-layer structure and the amorphous carbon matrix is part of an anode.

Embodiment 42 provides the method of any one of Embodiments 1-41, wherein the substrate is substantially free of degradation during irradiation of the precursor composition.

Embodiment 43 provides the method of any one of Embodiments 1-42, wherein the carbon composite structure ranges from about 0.01 wt % of the composite to about 50 wt % of the composite.

Embodiment 44 provides the method of any one of Embodiments 1-43, supporwherein the support phase precursor comprises a metal alkoxide, a metal oxide, a polyoctahedral silsesquioxane, or a combination thereof Embodiment 45 provides the method of any one of Embodiments 1-44, wherein the precursor composition comprises:

the support phase precursor;

the light absorbing component the carbon component, wherein the carbon component is phenol formaldehyde resin.

Embodiment 46 provides a battery comprising:

a substrate;

an anode layer comprising a carbon composite structure disposed on the substrate to form an electrode, wherein the carbon composite structure comprises at least one of a nanowire, a nanotube, a nanoribbon, an amorphous carbon matrix, and a metal or metal oxide nanoparticle.

Embodiment 47 provides the battery of Embodiment 46, wherein the battery is a lithium-ion battery.

Embodiment 48 provides the battery of any one of Embodiments 1-47, wherein the substrate comprises at least one of a metal and a polymer.

Embodiment 49 provides the battery of Embodiment 48, wherein the metal is at least one of aluminum, nickel, and copper.

Embodiment 50 provides the battery of any one of Embodiments 46-49, wherein the substrate comprises a conductive material.

Embodiment 51 provides the battery of any one of Embodiments 46-50, wherein the substrate is substantially rod-shaped.

Embodiment 52 provides the battery of any one of Embodiments 46-51, wherein the substrate comprises a metallic foil.

Embodiment 53 provides the battery of any one of Embodiments 46-52, wherein the foil comprises at least one of aluminum, nickel, and copper.

Embodiment 54 provides the battery of any one of Embodiments 46-53, wherein the substrate comprises a first polymer.

Embodiment 55 provides the battery of Embodiment 54, wherein the first polymer component ranges from about 50 wt % to about 100 wt % of the substrate.

Embodiment 56 provides the battery of Embodiment 54, wherein the first polymer ranges from about 90 wt % to about 100 wt % of the substrate.

Embodiment 57 provides the battery of Embodiment 56, wherein the first polymer is a thermoplastic polymer, a thermosetting polymer, or a mixture thereof.

Embodiment 58 provides the battery of Embodiment 56, wherein the first polymer is chosen from polyacetals, polyacrylics, polycarbonates, polystyrenes, polyesters, polyamides, polyamideimides, polyarylates, polyacrylates, polymethylmethacrylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, polyolefins, polyacrylamides, epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, unsaturated polyesterimides, and a mixture thereof.

Embodiment 59 provides the battery of any one of Embodiments 46-58, wherein the carbon composite structure comprises at least one of a nanowire, nanotube, and nanoribbon have a width ranging from about 5 nanometers to about 500 nanometers.

Embodiment 60 provides the battery of Embodiment 59, wherein the at least one nanowire, nanotube, and nanoribbon have a width ranging from about 20 nanometers to about 50 nanometers.

Embodiment 61 provides the battery of any one of Embodiments 46-60, wherein the metal or metal oxide nanoparticle comprises silicon, silicon carbide, iron, iron oxide, copper, nickel, palladium, platinum, ruthenium, rubidium, alloys thereof, or mixtures thereof.

Embodiment 62 provides the battery of any one of Embodiments 46-61, wherein battery comprises a plurality of chambers.

Embodiment 63 provides the battery of any one of Embodiments 46-62, wherein the carbon composite structure comprises a pattern formed from a plurality of protrusions extending from the substrate.

Embodiment 64 provides the battery of Embodiment 63, wherein a first width in an x-direction of a first individual protrusion is different than a second width in the x-direction of a second individual protrusion.

Embodiment 65 provides the battery of Embodiment 63, wherein a width in an x-direction of an individual protrusion is in a range of from about 900 nm to about 900 μm.

Embodiment 66 provides the battery of Embodiment 63, wherein a width in an x-direction of an individual protrusion is in a range of from about 800 nm to about 10 μm.

Embodiment 67 provides the battery of Embodiment 63, wherein a length in a y-direction of at least one of the first individual protrusion and the second individual protrusion in a range of from about 1.5 times to about 20 times greater than the width.

Embodiment 67 provides the battery of Embodiment 63, wherein a distance between adjacent individual protrusions is in a range of from about 2000 nm to about 500 μm.

Embodiment 68 provides the battery of Embodiment 63, wherein a distance between adjacent individual protrusions is in a range of from about 1600 nm to about 10 μm.

Embodiment 69 provides the battery of Embodiment 63, wherein a profile of an individual protrusion is chosen from a circle, an oval, or a polygonal shape.

Embodiment 70 provides the battery of Embodiment 69, wherein the polygonal shape is chosen from a triangle, a square, a rectangle, a pentagon, a hexagon, a heptagon, and an octagon.

Embodiment 71 provides the battery of any one of Embodiments 46-70, further comprising a separator layer dispensed on the anode layer.

Embodiment 72 provides the battery of Embodiment 71, wherein the separator layer comprises at least one of microparticles, nanoparticles, and a binder.

Embodiment 73 provides the battery of Embodiment 72, wherein the microparticles are in a range of from about 30 wt % to about 100 wt % of the separator layer.

Embodiment 74 provides the battery of Embodiment 72, wherein the microparticles are in a range of from about 90 wt % to about 100 wt % of the separator layer.

Embodiment 75 provides the battery of Embodiment 72, wherein the microparticles comprise particles chosen from polymethylurea, melamine formaldehyde resin, lithium polyacrylate, polyamide, poly(lithium 2-acrylamido-2-methylpropanesulfonate), silicon dioxide ($SiO_2$), aluminum oxide ($Al_2O_3$), pseudoboehmite (AlO(OH)), titanium dioxide ($TiO_2$), zinc oxide (ZnO), potassium fluoride (KF), lithium fluoride (LiF), zeolite and calcium carbonate ($CaCO_3$).

Embodiment 76 provides the battery of Embodiment 72, wherein the nanoparticles are in a range of from about 30 wt % to about 100 wt % of the separator layer.

Embodiment 77 provides the battery of Embodiment 72, wherein the nanoparticles are in a range of from about 90 wt % to about 100 wt % of the separator layer.

Embodiment 78 provides the battery of Embodiment 72, wherein the nanoparticles comprise particles chosen from silicon dioxide ($SiO_2$), aluminum oxide ($Al_2O_3$), pseudoboehmite (AlO(OH)), niobium oxide ($Nb_2O_5$), tantalum oxide ($Ta_2O_5$), titanium dioxide ($TiO_2$), zirconium oxide ($ZrO_2$), tin dioxide ($SnO_2$), zinc oxide (ZnO), potassium fluoride (KF), lithium fluoride (LiF), mesoporous aluminosilicate ($Al_2SiO_5$), a mesoporous niobium-tantalum composite oxide and a mesoporous magnesium-tantalum composite oxide.

Embodiment 79 provides the battery of Embodiment 72, wherein the binder is in a range of from about 10 wt % to about 90 wt % of the separator layer.

Embodiment 80 provides the battery of Embodiment 72, wherein the binder is in a range of from about 30 wt % to about 50 wt % of the separator layer.

Embodiment 81 provides the battery of Embodiment 72, wherein the binder is chosen from polyvinyl alcohol, carboxyl group-modified polyvinyl alcohol, polyvinyl pyrrolidone, polyethylene oxide, polypropylene oxide, polyvinylidene fluoride, polyvinylidene fluoride-hexafluoropropylene copolymer, polyacrylic acid, lithium polyacrylate, poly(methyl methacrylate), poly(butyl acrylate), ethyl hydroxyethyl cellulose, styrene-butadiene resin, carboxymethyl cellulose, polyimide, polyacrylonitrile, polyurethane, ethyl-vinyl acetate copolymer and polyester.

Embodiment 75 provides the battery of any one of Embodiments 46-74, further comprising a cathode layer disposed on the separator layer.

Embodiment 76 provides the battery of Embodiment 75, wherein the cathode layer comprises a lithium oxide.

Embodiment 77 provides the battery of Embodiment 76, wherein the lithium oxide is in a range of from about 50 wt % to about 100 wt % of the cathode layer.

Embodiment 78 provides the battery of Embodiment 76, wherein the lithium oxide is in a range of from about 90 wt % to about 100 wt % of the cathode layer.

Embodiment 79 provides the battery of Embodiment 76, wherein the lithium oxide comprises a material chosen from lithium metal oxide ($LiCoO_2$), lithium nickel oxide ($LiNiO_2$), lithium manganese oxide ($LiMn_2O_4$), olivine lithium iron phosphate ($LiFePO_4$).

Embodiment 80 provides a method of forming a battery, the method comprising:
disposing a precursor composition on a substrate, the precursor composition comprising:
 a porogen component,
 a support phase precursor component;
 a carbon component,
 a light absorbing component; and
 a catalyst component; and
contacting the precursor composition with a mold, the mold comprising:
 a plurality of protrusions in contact with the precursor composition;
at least one of raising the temperature of the precursor composition and irradiating the precursor composition to form an anode layer;
disposing a separator layer on the anode layer; and
disposing a conductor layer on the anode layer to form the battery.

Embodiment 81 provides the method of Embodiment 80, wherein the separator layer is disposed on the precursor layer before the precursor layer is contacted with the mold and the mold contacts the separator layer and the precursor composition.

Embodiment 82 provides the method of any one of Embodiments 80 or 81, wherein the substrate comprises at least one of a metal and a polymer.

Embodiment 83 provides the method of Embodiment 82, wherein the metal is at least one of aluminum, nickel, and copper.

Embodiment 84 provides the method of any one of Embodiments 80-83, wherein the substrate comprises a conductive material.

Embodiment 85 provides the method of any one of Embodiments 80-84, wherein the substrate is substantially rod-shaped.

Embodiment 86 provides the method of any one of Embodiments 80-85, wherein the substrate comprises a metallic foil.

Embodiment 87 provides the method of any one of Embodiments 80-86, wherein the foil comprises at least one of aluminum, nickel, and copper.

Embodiment 88 provides the method of any one of Embodiments 80-87, wherein the substrate comprises a first polymer.

Embodiment 89 provides the method of Embodiment 88, wherein the first polymer component ranges from about 50 wt % to about 100 wt % of the substrate.

Embodiment 90 provides the method of Embodiment 88, wherein the first polymer ranges from about 90 wt % to about 100 wt % of the substrate.

Embodiment 91 provides the method of any one of Embodiments 80-90, wherein the porogen component ranges from about 5 wt % to about 50 wt % of the precursor composition.

Embodiment 92 provides the method of any one of Embodiments 80-91, wherein the porogen component ranges from about 20 wt % to about 40 wt % of the precursor composition.

Embodiment 93 provides the method of any one of Embodiments 80-92, wherein the porogen component comprises a second polymer.

Embodiment 94 provides the method of Embodiment 93, wherein the second polymer ranges from about 1 wt % to about 100 wt % of the porogen component.

Embodiment 95 provides the method of Embodiment 93, wherein the second polymer component ranges from about 90 wt % to about 100 wt % of the porogen component.

Embodiment 96 provides the method of Embodiment 93, wherein at least one of the first polymer and the second polymer are a thermoplastic polymer, a thermosetting polymer, or a mixture thereof.

Embodiment 97 provides the method of Embodiment 93, wherein at least one of the first polymer and the second polymer is chosen from polyacetals, polyacrylics, polycarbonates, polystyrenes, polyesters, polyamides, polyamideimides, polyarylates, polyacrylates, polymethylmethacrylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, polyolefins, polyacrylamides, epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, unsaturated polyesterimides, and a mixture thereof.

Embodiment 98 provides the method of Embodiment 93, where the second polymer is poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl (meth)acrylate), poly(methyl methacrylate-b-t-butyl methacrylate), poly(ethylene oxide-b-propylene oxide), poly(styrene-b-tetrahydrofuran), poly(styrene-b-isoprene-b-ethylene oxide), poly(styrene-b-dimethylsiloxane), poly(styrene-b-trimethylsilylmethyl methacrylate), poly(methyl methacrylate-b-dimethylsiloxane), poly(methyl methacrylate-b-trimethylsilylmethyl methacrylate), or a mixture thereof.

Embodiment 99 provides the method of Embodiment 93, where the second polymer is a graft block copolymer comprising two blocks, wherein each block has a polymer backbone and different graft polymers covalently bonded to the polymer backbone.

Embodiment 100 provides the method of Embodiment 99, where the graft block copolymer comprises (polynorbornene-graft-poly(styrene))-block-(polynorbornene-graft-poly(ethylene oxide)).

Embodiment 101 provides the method of any one of Embodiments 80-100, wherein the carbon component ranges from about 5 wt % to about 50 wt % of the precursor composition.

Embodiment 102 provides the method of any one of Embodiments 80-100, wherein the carbon component ranges from about 20 wt % to about 40 wt % of the precursor composition.

Embodiment 103 provides the method of Embodiment 102, wherein the carbon component comprises at least one of a substituted or unsubstituted C1-C40 alkyl, C1-C40 alkenyl, C1-C40 alkynyl, and mixtures thereof.

Embodiment 104 provides the method of Embodiment 102, wherein the carbon component is in a gaseous, solid, or liquid phase.

Embodiment 105 provides the method of Embodiment 102, wherein the carbon component comprises about 40 wt % carbon to about 90 wt % carbon.

Embodiment 106 provides the method of any one of Embodiments 80-105, wherein the catalyst component ranges from about 0.01 wt % to about 50 wt % of the precursor composition.

Embodiment 107 provides the method of any one of Embodiments 80-106, wherein the catalyst component ranges from about 1 wt % to about 15 wt % of the precursor composition.

Embodiment 108 provides the method of any one of Embodiments 80-107, wherein the catalyst component comprises at least one metal or metal oxide nanoparticle.

Embodiment 109 provides the method of Embodiment 108, wherein the at least one metal or metal oxide nanoparticle ranges from about 50 wt % to about 100 wt % of the catalyst component.

Embodiment 110 provides the method of Embodiment 108, wherein the at least one metal or metal oxide nanoparticle ranges from about 90 wt % to about 100 wt % of the catalyst component.

Embodiment 111 provides the method of Embodiment 108, wherein the metal or metal oxide nanoparticle has a size ranging from about 1 to about 100 nanometers.

Embodiment 112 provides the method of Embodiment 108, wherein the metal or metal oxide nanoparticle has a size ranging from about 1 to about 50 nanometers.

Embodiment 113 provides the method of Embodiment 108, wherein the metal or metal oxide nanoparticle comprises silicon, silicon carbide, iron, iron oxide, copper, nickel, palladium, platinum, ruthenium, rubidium, alloys thereof, or mixtures thereof.

Embodiment 114 provides the method of Embodiment 113, wherein the iron oxide is at least one of FeO, $Fe_2O_3$, $Fe_3O_4$, $Fe_4O_6$, $Fe_5O_7$, $Fe_{25}O_{32}$, $Fe_{13}O_{19}$, $Fe_2O_3$, $(Fe(OH)_2)$, and $(Fe(OH)_3)$.

Embodiment 115 provides the method of any one of Embodiments 80-114, wherein the precursor composition is irradiated with electromagnetic radiation.

Embodiment 116 provides the method of any one of Embodiments 80-115, wherein the electromagnetic radiation is supplied by a xenon flash lamp.

Embodiment 117 provides the method of any one of Embodiments 80-116, wherein and the carbon composite structure comprises at least one layer comprising at least one of a nanowire, a nanotube, and a nanoribbon.

Embodiment 118 provides the method of Embodiment 117, wherein the at least one nanowire, nanotube, and nanoribbon have a width ranging from about 5 nanometers to about 500 nanometers.

Embodiment 119 provides the method of Embodiment 117, wherein the at least one nanowire, nanotube, and nanoribbon have a width ranging from about 20 nanometers to about 50 nanometers.

Embodiment 120 provides the method of any one of Embodiments 80-119, wherein the carbon composite structure circumscribes the catalyst component.

Embodiment 121 provides the method of any one of Embodiments 80-120, wherein the carbon composite structure is part of an anode.

Embodiment 122 provides the method of any one of Embodiments 80-121, wherein the substrate is substantially free of degradation during irradiation of the precursor composition.

Embodiment 123 provides the method of any one of Embodiments 80-122, wherein the carbon composite structure ranges from about 0.01 wt % of the composite to about 50 wt % of the composite.

Embodiment 124 provides the method of any one of Embodiments 80-123, wherein the mold is substantially transparent.

Embodiment 125 provides a method comprising:
disposing upon a substrate, a precursor composition comprising:
a polymer, where the polymer is operative to form a porogen; a light absorbing component, a support phase precursor and a solvent;
irradiating the precursor composition with electromagnetic radiation of a wavelength and an intensity that is effective to degrade the polymer and to activate the support phase precursor; and
forming a hierarchical structure on the substrate.

Embodiment 126 provides the method of Embodiment 125, where the substrate is transparent to the electromagnetic radiation and where the electromagnetic radiation is absorbed primarily by the light absorbing component.

Embodiment 127 provides the method of any one of Embodiments 125 or 126, where the substrate comprises a first polymer that is chemically different from the polymer used in the precursor composition; and where the first polymer has a higher glass transition temperature, a higher melt temperature and a higher degradation temperature than at least one of the glass transition temperature, the melt temperature and the degradation temperature of the polymer used in the precursor composition.

Embodiment 128 provides the method of any one of Embodiments 125-127, where the substrate is flexible having an elastic modulus of less than $10^6$ GPa.

Embodiment 129 provides the method of any one of Embodiments 125-128, where the substrate, after the formation of the hierarchical structure, is rollable and is used in roll-to-roll processing.

Embodiment 130 provides the method of Embodiment 127, where the first polymer and the polymer used in the polymer used in the precursor composition are thermoplastic polymers, thermosetting polymers, blends of thermoplastic polymers, blends of thermosetting polymers, and blends of thermoplastic polymers with thermosetting polymers and are selected from the group of polyacetals, polyacrylics, polycarbonates polystyrenes, polyesters, polyamides, polyamideimides, polyarylates, polyacrylates, polymethylmethacrylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, polyolefins, polyacrylamides, epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, unsaturated polyesterimides, or a combination thereof.

Embodiment 131 provides the method of any one of Embodiments 125-130, where the polymer used in the precursor composition is a block copolymer and is selected from the group consisting of poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl (meth)acrylate), poly(methyl methacrylate-b-t-butyl methacrylate), poly(ethylene oxide-b-propylene oxide), poly(styrene-b-tetrahydrofuran), poly(styrene-b-isoprene-b-ethylene oxide), poly(styrene-b-dimethylsiloxane), poly(styrene-b-trimethylsilylmethyl methacrylate), poly(methyl methacrylate-b-dimethylsiloxane), poly(methyl methacrylate-b-trimethylsilylmethyl methacrylate), or a combination thereof.

Embodiment 132 provides the method of any one of Embodiments 125-131, where the polymer used in the precursor composition is a graft block copolymer comprising two blocks where each block has a polymer backbone and different graft polymers covalently bonded to the polymer backbone.

Embodiment 133 provides the method of Embodiment 132, where the graft block copolymer comprises (polynorbornene-graft-poly(styrene))-block-(polynorbornene-graft-poly(ethylene oxide)).

Embodiment 134 provides the method of any one of Embodiments 125-133, where the light absorbing component comprises nanoparticles that absorb light and heat up; where the nanoparticles are metal nanoparticles, carbonaceous nanoparticles, electrically conducting metal oxide nanoparticles, or a combination thereof.

Embodiment 135 provides the method of Embodiment 134, where the metal nanoparticles have a size of 1 to 100 nanometers and are selected from the group consisting of aluminum, copper, magnesium, chromium, tin, nickel, silver, iron, titanium, gold, platinum, palladium, or mixtures thereof; and where the carbonaceous nanoparticles are selected from the group consisting of carbon nanotubes, graphene nanoparticles, carbon black, fullerenes, buckyballs, or the like, or a combination thereof.

Embodiment 136 provides the method of any one of Embodiments 125-135, further comprising drying the precursor composition by heating it to a temperature of 50 to 200° C.

Embodiment 137 provides the method of any one of Embodiments 125-136, where the irradiating raises a temperature of the light absorbing components to a temperature greater than 300° C.

Embodiment 138 provides the method of any one of Embodiments 125-137, where the support phase precursor comprises a metal alkoxide, a metal oxide, a polyoctahedral silsesquioxane, or a combination thereof.

Embodiment 139 provides the method of Embodiment 138, where the support phase precursor is activated by heat and reacts to form a support phase that is porous.

Embodiment 140 provides the method of Embodiment 138, where the support phase precursor is not a polymer.

Embodiment 141 provides an article comprising:
a substrate:
a porous structure disposed thereon; where an area that is greater than 1 square meter of the substrate has the porous structure disposed on all of it.

Embodiment 142 provides the article of Embodiment 141, where the substrate with the porous structure disposed thereon has an area greater than 5 square meters.

Embodiment 143 provides the article of any one of Embodiments 141 or 142, where the substrate with the porous structure disposed thereon has an area greater than 10 square meters.

Embodiment 144 provides the article of any one of Embodiments 141-143, where the porous structure has a hierarchical structure.

Embodiment 145 provides the article of any one of Embodiments 141-144, where the porous structure comprises a metal oxide and/or a polyoctahedral silsesquioxane.

What is claimed is:

1. A method of forming a binder-free, mesoporous, graphitic multi-layer carbon composite structure, the method comprising:
disposing a precursor composition on a substrate, the precursor composition comprising:
a porogen component comprising a polymer;
a carbon component comprising phenol formaldehyde resin, glucose, cellulose, or 4-hydroxybenozic acid, brown sugar, barley sugar, caramel, cane sugar, corn syrup, starch, molasses, molasses raffinate, glucan, galactan, xylan, sugar waste product, activated carbon, carbon black, carbon fiber, carbon honeycomb or plate structure, aerogel carbon film, pyrolysis char, ($C_1$-$C_{40}$) alkane, ($C_1$-$C_{40}$) alkene, ($C_1$-$C_{40}$) alkyne, ($C_1$-$C_{40}$) aryl or a combination thereof; and
a metal or metal oxide nanoparticle comprising aluminum, magnesium, chromium, tin, silver, titanium, gold, silicon, silicon carbide, iron, iron oxide, copper, nickel, palladium, platinum, ruthenium, rubidium, alloys thereof, or mixtures thereof,
irradiating the disposed precursor composition so as to carbonize the precursor composition, decompose the porogen, and convert the carbon component to a graphitic material to form a binder-free, mesoporous, graphitic multi-layer carbon composite structure.

2. The method of claim 1, wherein irradiating the disposed precursor composition is performed with sub-millisecond light pulses.

3. The method of claim 1, wherein the graphitic material is generated during irradiation and the precursor composition is directly converted to the binder-free, mesoporous, multi-layer carbon composite without any addition of polymer, or binder materials.

4. The method of claim 1, wherein the porogen component ranges from about 5 wt % to about 50 wt % of the precursor composition.

5. The method of claim 1, wherein the polymer of the porogen component comprises a polyacetal, polyacrylic, polycarbonate, polystyrene, polyester, polyamide, polyamideimide, polyarylate, polyacrylate, polymethylmethacrylate, polyarylsulfone, polyethersulfone, polyphenylene sulfide, polyvinyl chloride, polysulfone, polyimide, polyetherimide, polytetrafluoroethylene, polyetherketone, polyether etherketone, polyether ketone, polybenzoxazole, polyoxadiazole, polybenzothiazinophenothiazine, polybenzothiazole, polypyrazinoquinoxaline, polypyromellitimide, polyquinoxaline, polybenzimidazole, polyoxindole, polyoxoisoindoline, polydioxoisoindoline, polytriazine, polypyridazine, polypiperazine, polypyridine, polypiperidine, polytriazole, polypyrazole, polypyrrolidine, polycarborane, polyoxabicyclononane, polydibenzofuran, polyphthalide, polyacetal, polyanhydride, polyvinyl ether, polyvinyl thioether, polyvinyl alcohol, polyvinyl ketone, polyvinyl halide, polyvinyl nitrile, polyvinyl ester, polysulfonate, polysulfide, polythioester, polysulfone, polysulfonamide, polyurea, polyphosphazene, polysilazane, polysiloxane, polyolefin, polyacrylamide, epoxy polymer, unsaturated polyester polymer, polyimide polymer, bismaleimide polymer, bismaleimide triazine polymer, cyanate ester polymer, vinyl polymer, benzoxazine polymer, benzocyclobutene polymer, acrylic, alkyd, phenol-formaldehyde polymer, novolac, resole, melamine-formaldehyde polymer, urea-formaldehyde polymer, hydroxymethylfuran, isocyanate, unsaturated polyesterimide, or a mixture thereof.

6. The method of claim 1, where the polymer of the porogen component comprises a poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl (meth)acrylate), poly(methyl methacrylate-b-t-butyl methacrylate), poly(ethylene oxide-b-propylene oxide), poly(styrene-b-tetrahydrofuran), poly(styrene-b-isoprene-b-ethylene oxide), poly(styrene-b-dimethylsiloxane), poly(styrene-b-trimethylsilylmethyl methacrylate), poly(methyl methacrylate-b-dimethylsiloxane), poly(methyl methacrylate-b-trimethylsilylmethyl methacrylate), or a mixture thereof.

7. The method of claim 1, wherein the porogen component comprises a block copolymer that comprises polystyrene and polyethylene oxide.

8. The method of claim 1, wherein the porogen component comprises polynorbornene-graft-poly(styrene))-block-(polynorbornene-graft-poly(ethylene oxide)) brush block copolymer.

9. The method of claim 1, wherein at the metal or metal oxide nanoparticle ranges from about 0.01 wt % to about 50 wt % of the precursor composition.

10. The method of claim 1, wherein the metal or metal oxide nanoparticle ranges from about 1 wt % to about 15 wt % of the precursor composition.

11. The method of any one of claim 1, wherein the binder-free, mesoporous, graphitic multi-layer carbon composite structure comprises at least one layer of the carbon composite having at least one of a nanowire, a nanotube, and a nanoribbon, wherein the at least one nanowire, nanotube, and nanoribbon have a width ranging from about 5 nanometers to about 500 nanometers.

12. The method of claim 11, wherein the at least one nanowire, nanotube, and nanoribbon have a width ranging from about 20 nanometers to about 50 nanometers.

13. The method of claim 1, wherein the binder-free, mesoporous, graphitic multi-layer carbon composite structure comprises a pattern formed from a plurality of protrusions extending from the substrate.

14. The method of claim 1, wherein the porogen component ranges from about 20 wt % to about 40 wt % of the precursor composition.

15. The method of claim 1, wherein about 90 wt % to about 100 wt % of the porogen component is polymer.

16. The method of claim 1, wherein the carbon component ranges from about 5 wt % to about 50 wt % of the precursor composition.

17. The method of claim 1, wherein the substrate comprises a conductive material, comprises a polymer, or both.

18. The method of claim 1, wherein the metal or metal oxide nanoparticle is coated with an organic functional group.

19. A method of forming a binder-free, mesoporous, graphitic multi-layer carbon composite structure, the method comprising:
- disposing a carbon-containing precursor composition on a substrate that comprises a metal, the precursor composition comprises:
- a porogen that is a block copolymer; and
- phenol formaldehyde resin, glucose, cellulose, or 4-hydroxybenozic acid; and
- at least one of gold nanoparticles coated with 4-mercaptophenol or iron/iron oxide nanoparticles coated with 4-hydroxybenzoic acid;
- irradiating the disposed precursor composition with sub-millisecond light pulses so as to carbonize the precursor composition, decompose the porogen, and convert the phenol formaldehyde resin, glucose, cellulose, or 4-hydroxybenozic acid to a graphitic material to form a binder-free, mesoporous, graphitic multi-layer carbon composite structure.

20. A method of forming a binder-free, mesoporous, graphitic multi-layer carbon composite structure, the method comprising:
- disposing a precursor composition on a substrate, which comprises a first polymer, and the precursor composition comprising:
- a porogen comprising a block copolymer;
- a carbon component comprising phenol formaldehyde resin, glucose, cellulose, or 4-hydroxybenozic acid; and
- a metal or metal oxide nanoparticle selected from aluminum, magnesium, chromium, tin, silver, titanium, gold, silicon, silicon carbide, iron, iron oxide, copper, nickel, palladium, platinum, ruthenium, rubidium, alloys thereof, or mixtures thereof;
- irradiating the disposed precursor composition with sub-millisecond light pulses so as to carbonize the precursor composition, decompose the porogen, and convert the carbon component to a graphitic material to form a binder-free, mesoporous, graphitic multi-layer carbon composite structure,
- wherein the graphitic material is generated during irradiation, and the precursor composition is directly converted to the binder-free, mesoporous, graphitic multi-layer carbon composite without any addition of polymer, or binder materials.

* * * * *